US009026995B2

(12) United States Patent
Spassov et al.

(10) Patent No.: US 9,026,995 B2
(45) Date of Patent: May 5, 2015

(54) SOFTWARE SETTINGS MANAGEMENT TOOL

(75) Inventors: Miroslav Iordanov Spassov, Kenmore, WA (US); Kenneth Todd Murray, Kenmore, WA (US)

(73) Assignee: The Boeing Company, Chicago, IL (US)

( * ) Notice: Subject to any disclaimer, the term of this patent is extended or adjusted under 35 U.S.C. 154(b) by 384 days.

(21) Appl. No.: 13/430,031

(22) Filed: Mar. 26, 2012

(65) Prior Publication Data
US 2013/0254741 A1 Sep. 26, 2013

(51) Int. Cl.
*G06F 9/44* (2006.01)

(52) U.S. Cl.
CPC ........................ *G06F 8/71* (2013.01)

(58) Field of Classification Search
CPC .................................. H04L 41/0859
See application file for complete search history.

(56) References Cited

U.S. PATENT DOCUMENTS

| 8,055,393 B2 | 11/2011 | Sims, III et al. | |
| 2003/0041313 A1* | 2/2003 | Harmon | 717/105 |
| 2005/0102632 A1* | 5/2005 | Klinger et al. | 715/789 |
| 2005/0283733 A1* | 12/2005 | Ellinger et al. | 715/762 |
| 2010/0037206 A1* | 2/2010 | Larimore et al. | 717/109 |
| 2010/0058206 A1* | 3/2010 | Ollrogge et al. | 715/762 |
| 2011/0145789 A1* | 6/2011 | Rasch et al. | 717/121 |
| 2013/0145349 A1* | 6/2013 | Basak et al. | 717/121 |
| 2013/0167117 A1* | 6/2013 | Razvi et al. | 717/121 |
| 2013/0179862 A1* | 7/2013 | Kinder et al. | 717/121 |
| 2013/0298104 A1* | 11/2013 | Kletsky et al. | 717/102 |
| 2013/0298109 A1* | 11/2013 | Trinchini et al. | 717/121 |

OTHER PUBLICATIONS

Reidar Conradi et al.; Version Models for Software Configuration Management; 1998 ACM; pp. 232-282; <http://dl.acm.org/citation.cfm?id=280280>.*
Jacky Estublier et al.; Impact of Software Engineering Research on the Practice of Software Configuration Management; 2005 ACM; pp. 383-430; <http://dl.acm.org/citation.cfm?id=1101817>.*
Monchai Sopitkamol et al.; A Method for Evaluating the Impact of Software Configuration Parameters on E-Commerce Sites; 2005 ACM; pp. 53-64; <http://dl.acm.org/citation.cfm?id=1071027>.*
Anita Sarma et al.; Empirical Evidence of the Benefits of Workspace Awareness in Software Configuration Management; 2008 ACM; pp. 113-123; <http://dl.acm.org/citation.cfm?id=1453118>.*
Gerald Bortis et al.; Towards Supporting Awareness of Indirect Conflicts across Software Configuration Management Workspaces; 2007 ACM; pp. 94-103; <http://dl.acm.org/citation.cfm?id=1321647>.*
Laura Wingerd et al.; High-Level Best Practices in Software Configuration Management; 1998 Springer; pp. 57-66; <http://link.springer.com/chapter/10.1007/BFb0053878>.*
Michael Neukirchen, CATIA V5 SettingExplorer V1.4.3, IBM Product Lifecycle Management, New World, New Rules, New Ways to Win, IBM Tool—CATIA SettingExplorer, 2004, pp. 1-17.

* cited by examiner

*Primary Examiner* — Thuy Dao
*Assistant Examiner* — Cuong V Luu
(74) *Attorney, Agent, or Firm* — Kunzler Law Group, PC

(57) ABSTRACT

A software settings management tool is described that automates much of the process of checking, changing, creating and/or maintaining software settings. The software settings management tool provides users and/or administrators with user-friendly interfaces to view, modify and save all of their software settings (perhaps thousands of settings, extracted from thousands of proprietary software files) all in one place, while the underlying methods and routines of the software settings management tool handle the complex and error-prone tasks of managing modifications of proprietary files and ensuring that added and changed settings are installed correctly.

17 Claims, 17 Drawing Sheets

SOFTWARE SETTINGS MANAGEMENT TOOL

CROSS-REFERENCE TO RELATED APPLICATIONS

None.

FIELD

The present disclosure relates to a computer program and more particularly to a software tool that provides for management of complex software settings.

BACKGROUND

CATIA (Computer Aided Three-dimensional Interactive Application) is a multi-platform CAD/CAM/CAE commercial software suite written in the C++ programming language. CATIA was developed by a French company known as Dassault Systemes, and CATIA is included in Dassault Systemes' product lifecycle management software suite. CATIA supports multiple stages of product development, from conceptualization, design (CAD), manufacturing (CAM), and engineering (CAE). CATIA facilitates collaborative engineering across disciplines, including surfacing and shape design, mechanical engineering, equipment and systems engineering. CATIA can be applied to a wide variety of industries, from aerospace and defense, automotive, and industrial equipment, to high tech, shipbuilding, consumer goods, plant design, consumer packaged goods, life sciences, architecture and construction, process power and petroleum, and services.

When the CATIA client software program runs, it reads pre-defined settings (known as CATSettings) that are stored in files referred to as .CATSetting files (or .CatSetting files or CATSettings files) to determine how CATIA looks and acts. CATSettings are used to control many different options and features within CATIA, including many options and features which the end user may take for granted but may be nonetheless critical. For example, one CATSetting may keep track of a user's setup options such as the options that are accessible via the "Tools>Options" menu. Other CATSettings may control the appearance and functionality of toolbar locations, starting windows, the location of help documents and even licensing and access information. Other CATSettings may control whether an end user sees certain measurements in metric or English units. Yet other CATSettings may control and/or limit the way that end products are designed using the CATIA tool, such as the way curves behave when an engineer is drawing a structure or other design features used to create an engineering model.

CATSettings are permanent (unless changed) settings which are stored inside of files (.CATSetting files) that are normally stored on the local machine of the client/end user. Because these files and settings are permanent, they are retained on the end user's computer between sessions, and therefore will not typically change unless intentionally altered or deleted.

If for some reason these CATSettings are misconfigured or become corrupt, an end user may run into many serious problems with the operation of his or her CATIA environment. Because the appearance and functionality of just about every feature in CATIA is affected in some way by CATSettings, incorrect or corrupt CATSettings can cause major headaches to end users and/or major setbacks to engineering projects. In some instances CATSettings can even become corrupted without any fault by a user. In fact, the makers of CATIA are aware of this issue and have at times recommended that users remove their CATSettings once every release and/or every service pack. Some users even remove their CATSettings every day, just to be safe.

Not only may a user need to check and update settings in order to avoid dealing with corrupted CATSettings, but also, companies may have specific requirements for many CATIA settings and often require that their engineers follow certain standards and settings. A company's model CATIA settings may change frequently either as a result of a new CATIA software release or as a result of company-initiated modifications.

At least some users of CATIA rely on approximately 3,000 settings that control how the software program looks and operates, and CATIA may come preloaded with default values for some or all of these settings. Each one of these settings may need to be checked manually and changed manually if needed. If a company changes their standards, a user or an administrator may need to manually change all the CATIA settings to comply with the standards change. Alternatively, if a new software version is released, an employee may need to manually check all the CATIA settings to make sure they comply with company standards. Additionally, a company may need to manage CATIA settings for numerous software products and user environments as well as numerous hardware platforms (for example, 32 and 64-bit).

Manually altering and checking CATIA settings is a tedious, slow, and error prone process, which could easily take several days to complete. Creating CATIA settings is time consuming because each setting must be created manually, and values must be assigned manually. Checking CATIA settings to ensure they are set as desired is also time consuming because it requires a manual comparison of each setting and value with the desired settings and values. Moreover, as mentioned above, if CATIA settings are entered incorrectly, CATIA may operate significantly differently than the user may require. Therefore, it is important for users of CATIA software to institute a procedure for dealing with their CATSetting so that settings can be entered and checked as quickly as possible with minimal errors.

SUMMARY

One or more embodiments of the present disclosure describe a software settings management tool that automates much of the process of checking, changing, creating and/or maintaining software settings.

In one advantageous embodiment, a method is executed on a data processing system (i.e., a computer) which adapts the computer for managing software settings. First, a pre-defined utility may be executed on the computer to convert one or more files of a proprietary format into one or more markup language files. Each file of a proprietary format may include data representing one or more software settings that control the way a software program looks or functions or both, and each markup language file may include data representing one or more abstracted settings that correlate to one or more software settings contained in one or more of the files of a proprietary format. Next, a routine may be executed on the computer that combines the data from the one or more markup language files with data from a template file to create a single combination of data. The template file may include data representing one or more abstracted settings, and the template file may include, for at least one abstracted setting, path data that indicates a feature or setting in the software program's graphical user interface. Then, the single combination of data may be displayed to a user via a user interface that communicates with a display coupled to the computer.

In another advantageous embodiment, a data processing system (i.e., a computer) may comprise (1) a bus; (2) a storage device or memory device connected to the bus, wherein the storage device or memory device may include computer usable program code; (3) a display connected to the bus; and (4) a processor unit connected to the bus, wherein the processor unit may execute the computer usable program code. The computer usable program code may include one or more instructions and/or routines that, when executed by the processor unit, may adapt the data processing system for managing software settings. First, the computer usable program code may include an instruction that executes a pre-defined utility to convert one or more files of a proprietary format into one or more markup language files. Each file of a proprietary format may include data representing one or more software settings that control the way a software program looks or functions or both, and each markup language file may include data representing one or more abstracted settings that correlate to one or more software settings contained in one or more of the files of a proprietary format. Next, the computer usable program code may include a routine that combines the data from the one or more markup language files with data from a template file to create a single combination of data. The template file may include data representing one or more abstracted settings, and the template file may include, for at least one abstracted setting, path data that indicates a feature or setting in the software program's graphical user interface. Then, the computer usable program code may include a routine that causes the single combination of data to be displayed to a user via a user interface that communicates with the display.

In yet another advantageous embodiment, a method is executed on a data processing system (i.e., a computer) which adapts the computer for managing software settings. First, a display coupled to the computer may display a user interface that allows a user to select a first one or more files of a proprietary format. Each of the first one or more files of a proprietary format may include data representing one or more software settings that control the way a software program looks or functions or both. Next, a pre-defined utility may be executed on the computer to convert the first one or more files of a proprietary format into one or more markup language files. Each markup language file may include data representing one or more abstracted settings that correlate to one or more software settings contained in the one or more of the files of a proprietary format. Next, a routine may be executed on the computer that combines the data from the one or more markup language files to create a single combination of data. Next, a routine may be executed on the computer that saves the single combination of data to a snapshot file that is stored on a memory device. Next, a display coupled to the computer may display a user interface that allows a user to select the snapshot file. Next, a pre-defined utility may be executed on the computer to convert data from the snapshot file into a second one or more files of a proprietary format.

The features, functions, and advantages that have been discussed can be achieved independently in various embodiments or may be combined in yet other embodiments, further details of which can be seen with reference to the following description and drawings.

BRIEF DESCRIPTION OF THE DRAWINGS

Several features and advantages are described in the following disclosure, in which several embodiments are explained, using the following drawings as examples.

FIG. 9 is an illustration of an example display that may be related to an administration tool according to one or more embodiments of the present disclosure.

FIG. 10 is an illustration of an example display that may be related to an administration tool according to one or more embodiments of the present disclosure.

FIG. 11 is an illustration of an example display that may be related to an administration tool according to one or more embodiments of the present disclosure.

DETAILED DESCRIPTION

Figure 1:
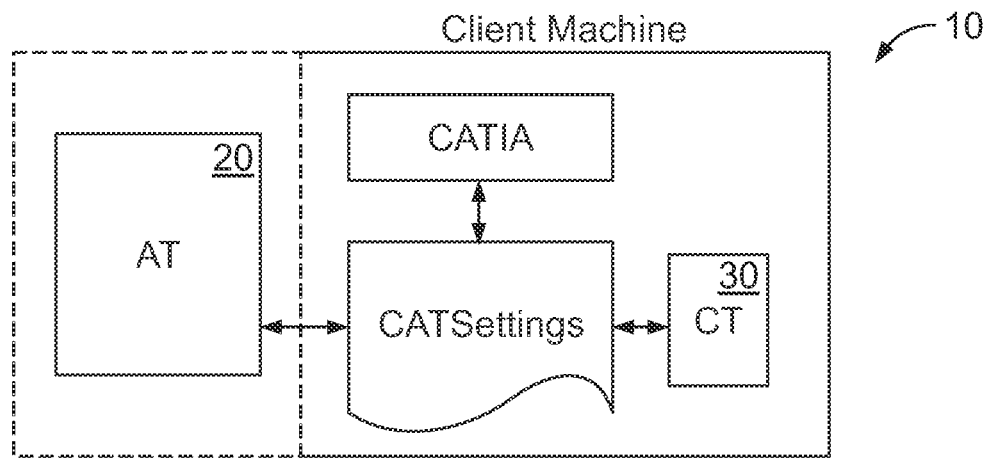
FIG. 1 is an illustration of a block diagram showing example components and interactions of a software settings management tool according to one or more embodiments of the present disclosure.

Even though some users of the CATIA software have implemented procedures to manage their CATSettings, there are disadvantages to current procedures. Currently, many users of CATIA software use complex manual review and change procedures to manage their CATSettings. For example, some companies have maintained a complex spreadsheet with lists of settings, values and other information, and each time a new version of the CATIA software is received, employees manually input settings and values so that the CATIA user interface (CATIA GUI) looks and operates as required. In some instances, thousands of settings and values related to individual settings are manually input from such a spreadsheet, a process that may take between 40 and 80 man-hours per release. In one example, a company maintained a 26-step manual process to modify a single CATSetting. In another example, a company executed a 28-step manual process to test newly entered settings. These tedious manual update and check procedures may need to be reenacted for each minor release of the software (service pack or hot fix change), and a complete new set of desired settings may need to be created for each major release of the software (R17, R18, and the like). Furthermore, the CATSettings on each client workstation that runs CATIA must be checked and/or changed each time model settings are changed or a new version of the software is released.

Further complicating the process of maintaining CATSettings as desired by a company is the method by which CATIA requires the CATSettings to be viewed and modified. The actual CATSettings (the ones that directly determine how the CATIA GUI looks and operates) and the associated .CATSetting files are difficult to edit directly. The .CATSettings files may exist in a proprietary format. A file of a proprietary format is a file that is formatted such that the data in the file is stored, accessed and/or read only in a certain manner, a manner that perhaps only the individual or organization (the makers of CATIA for example) which asserts ownership over the proprietary format knows and uses. Additionally, in some instances, the .CATSetting files may not be visible to a user and/or a user may not know where to find the .CATSetting files. Instead of allowing users to modify the CATSettings directly, CATIA includes a CATSettings GUI that allows a user view and modify "CATIA settings". However, there is not a one-to-one correlation between the "CATIA settings" that the user sees in the CATSettings GUI and the actual CATSettings located in .CATSetting files. In other words, there is no direct (or at least visible) mapping from the "CATIA settings" to the actual CATSetting files themselves. Instead, the CATSettings GUI allows the user to change "CATIA settings," and when the user implements such a change, the CATSettings GUI may change one or more actual CATSettings. Moreover, the CATSettings GUI may take the liberty to add additional information into the .CATSetting files such as user information and the like, information that a company may not want added to its files. In short, the CATSettings GUI introduces a level of abstraction between the user and the actual CATSettings, which may frustrate an attempt to fine tune actual CATSettings. Accordingly, the tedious manual update procedures currently implemented by companies, further require employees to use this CATSettings GUI, which offers limited functionality and prevents automation of tasks, which in turn introduces another potential source of error and uncertainty.

Therefore, a more efficient system for dealing with CATSetting may, among other advantages, allow users to spend their time working productively instead of spending valuable time managing settings, all the while providing users and administrators with confidence that the CATSettings are configured and installed properly.

The present disclosure describes an improved method of managing and changing CATSettings by using a software settings management tool (SSMT) that automates much of the process of checking, changing and/or creating CATIA settings. The SSMT provides users and/or administrators with user-friendly interfaces to view, modify and save all of their CATIA settings (perhaps extracted from hundreds or thousands of .CATSettings files), while the underlying methods and routines of the SSMT handle the complex and error-prone tasks of managing modifications of .CATSetting files and ensuring that added and changed settings are installed correctly.

The software methods, routines and solutions of the present disclosure may operate to manage many settings of the CATIA software program, but it should be understood that the software methods, routines and solutions described herein typically do not include any methods, routines or code created by the makers of CATIA. It should be understood that CATIA is just one example of CAD software, not to mention other types of software, that references settings files, and therefore, throughout this disclosure, whenever reference is made to CATIA, CATSettings, .CATSettings files, CATIA executable utilities and the like, the solutions, benefits and details discussed in this disclosure may also apply to other types of CAD software and/or other types of software that read settings from files. Therefore, even though CATIA is used as an example throughout this disclosure, no reference to CATIA, CATSettings or CATIA utilities specifically should be understood to limit the application of the present descriptions to a specific software tool or specific settings or settings files. For example, the solutions, benefits and details discussed in this disclosure may apply to other software programs created by Dassault Systemes (the maker of CATIA), including programs included in the Dassault Systemes family of products. Likewise, the solutions, benefits and details discussed in this disclosure may apply to software programs created by other CAD tool companies.

Additionally, the SSMT may use one or more executable utilities, created by the makers of the CAD software program (or another third party), to perform various functions. For example, one utility may convert a file of a proprietary format to a file of a more universal format. Two specific examples of Dassault Systemes utilities that the SSMT may utilize are CATBatGenXMLSet.exe and CATBatImpXMLSet.exe. These utilities may be required for the SSMT to operate effectively, but it should be understood that the methods, routines or code of these utilities are typically not included as part of the software methods, routines and solutions of the present disclosure.

Figure 2:
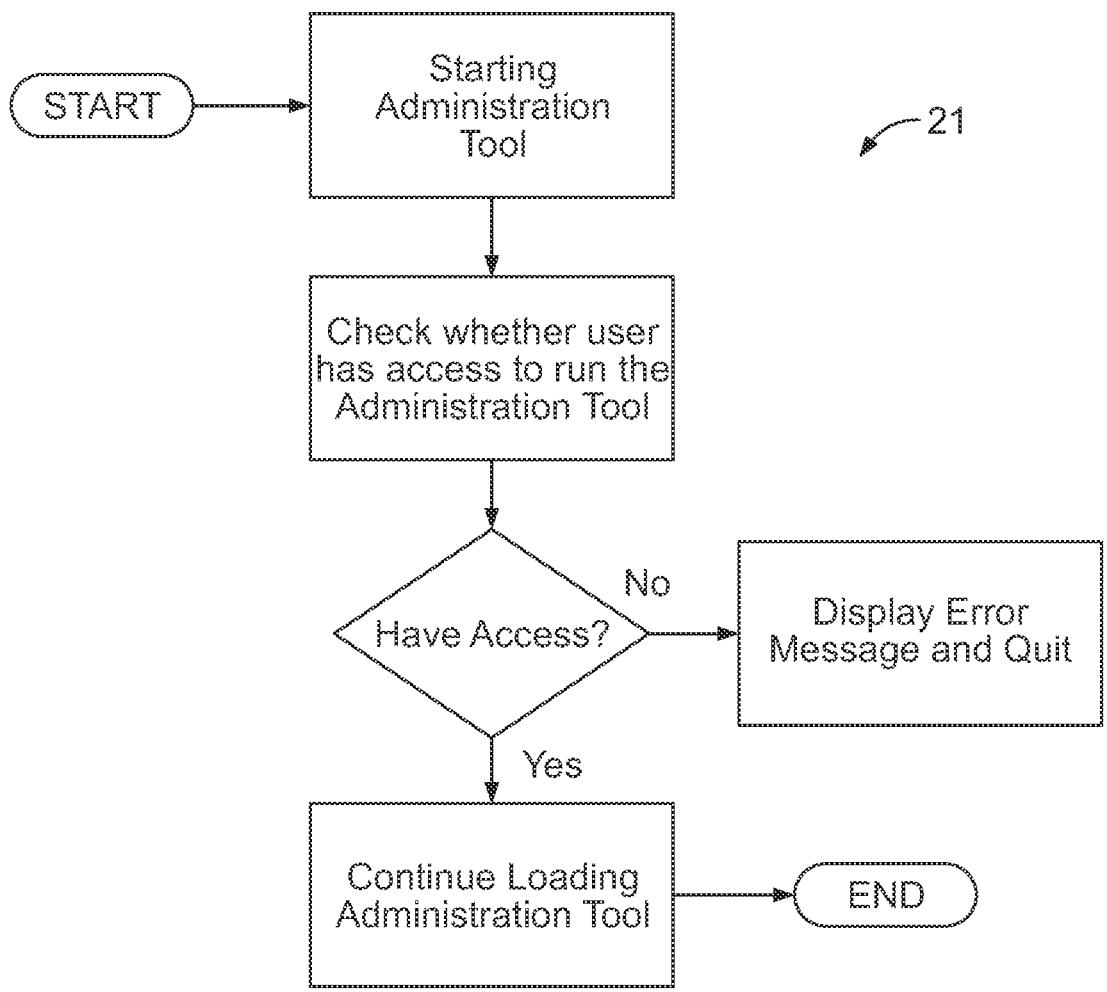
FIG. 2 is an illustration of a high level flowchart showing example operations performed by an administration tool according to one or more embodiments of the present disclosure.

Turning now to FIG. 1, the SSMT 10 may be comprised of two main sub-tools: (1) the administration tool (AT) 20 and the client tool (CT) 30. The AT 20 may be run by a restricted group of people (people with required authorization) within an organization, and by utilizing the AT 20, this restricted group of people may access certain files and make certain changes that a regular end user may not. FIG. 2 depicts a flow chart of an example access check routine 21 that may check whether a user that attempts to run that AT 20 has sufficient authority/access. The CT 30 may be run by the end user of a client machine where a client CATIA software program has been installed. As can be seen in FIG. 1, the AT 20 may or may not be installed and executed on a particular client machine. If the pool of client machines is relatively small, the AT 20 may be installed and run on a client machine; however, if the pool of client machines is larger, the AT 20 may be installed on a separate machine, for example, an administrator machine (or server) that is connected to the client machine(s) via a network. In some embodiments, the AT 20 may be used to finalize settings applicable to several client machines before a version of the software is "pushed" to the client machines. In other instances, however, the AT 20 may manage settings related to a single client machine, either before or after installing the CATIA software.

Figure 3:
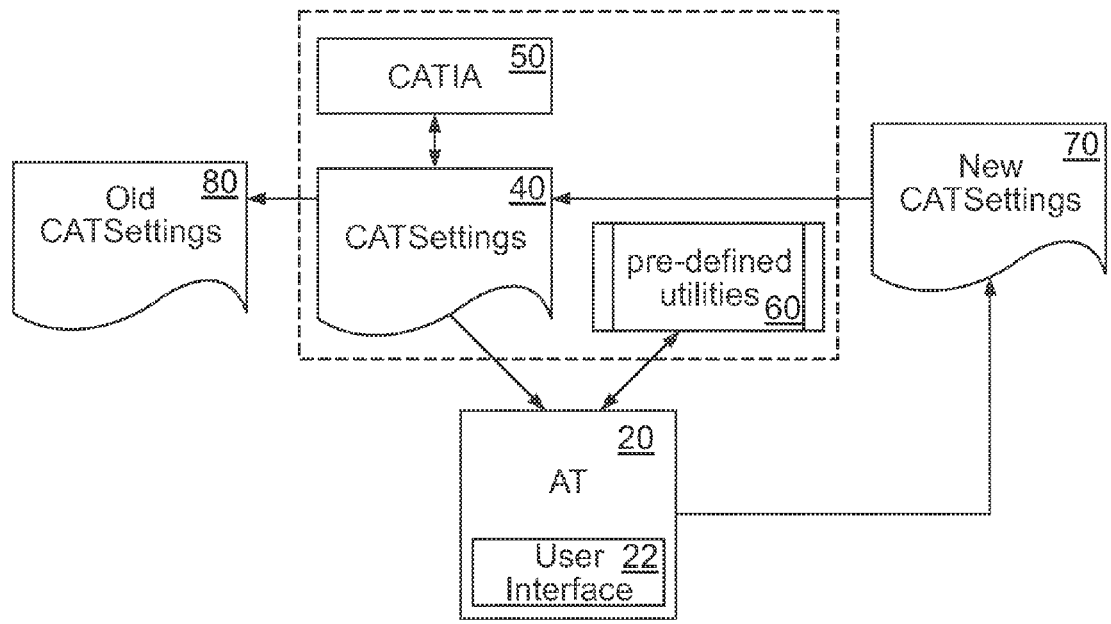
FIG. 3 is an illustration of a block diagram showing example components and interactions of an administration tool according to one or more embodiments of the present disclosure.

FIG. 3 shows a high level example illustration of how the AT 20 may interact with a variety of programs, utilities and files that may be installed on either an administration machine or a client machine. In this example, the AT 20 accepts as input CATSettings 40 that either are currently controlling or will eventually control how the CATIA program 50 looks and acts. Additionally, the AT 20 may interact with one or more pre-defined executable utilities 60. The AT 20 may include an AT user interface 22 that interacts with a user by communication with a visual display and perhaps other peripheral devices. The AT user interface 22 may allow a user to view the status of and perhaps control various processes being executed by the AT 20. When the AT 20 is finished managing a set of CATSettings, it may create a temporary new set of CATSettings 70 whereby the new set of CATSettings 70 may eventually replace the current CATSettings 40. Likewise, the current set of CATSettings 40 may be copied or saved as an old set of CATSettings 80 before the current CATSettings 40 are replaced by the new CATSettings 70. It should be understood that this is just an example, and the AT 20 may interact with different versions and copies of files similar to the ones shown. For example, the AT 20 may accept as input the current CATSettings as installed on a client machine, or it may accept as input a new set of CATSettings as provided by the maker of CATIA in a new software release.

Figure 4:
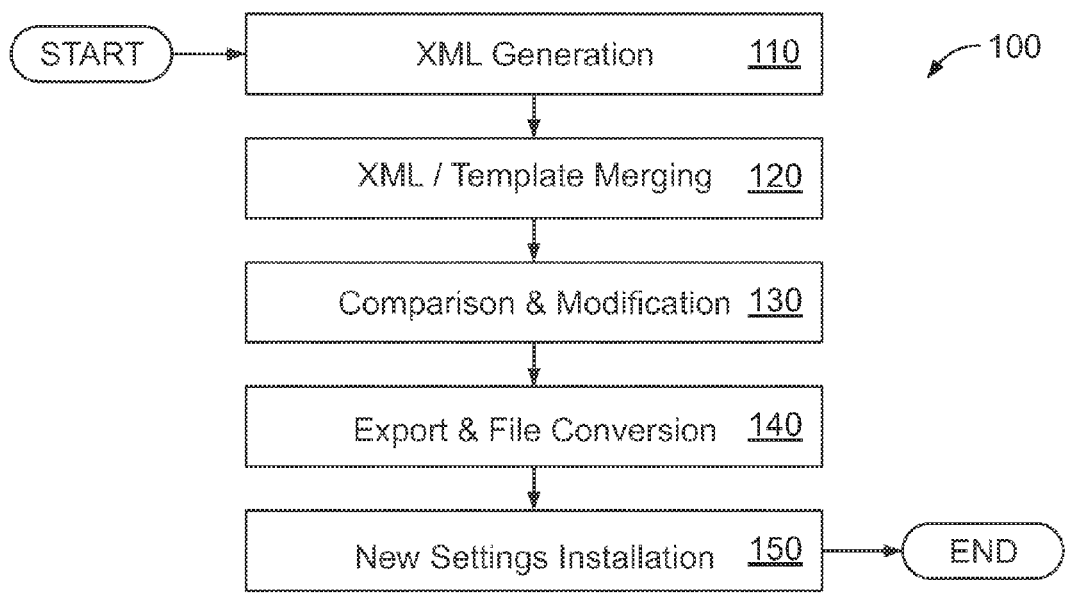
FIG. 4 is an illustration of a high level flowchart showing example operations performed by an administration tool according to one or more embodiments of the present disclosure.

In some embodiments of the present disclosure, the AT 20 includes a method that further includes steps, routines and/or processes described in this disclosure. FIG. 4 shows an illustration of a high level flowchart of an example method 100 that may be executed by a data processing system (i.e., a computer) in order to change, create, check and/or maintain CATIA settings. In this example, the method 100 includes the following steps: XML Generation 110, XML/Template Merging 120, Comparison and Modification 130, Export and File Conversion 140 and New Settings Installation 150. It should be understood that this is only one example of a method that the AT 20 may use to change, create, check and/or maintain CATIA settings. Other example methods may execute one or more of these steps out of order, or may include more or less steps than shown. Additionally, the steps may be altered to some extent from the steps shown and described herein.

Figure 5:
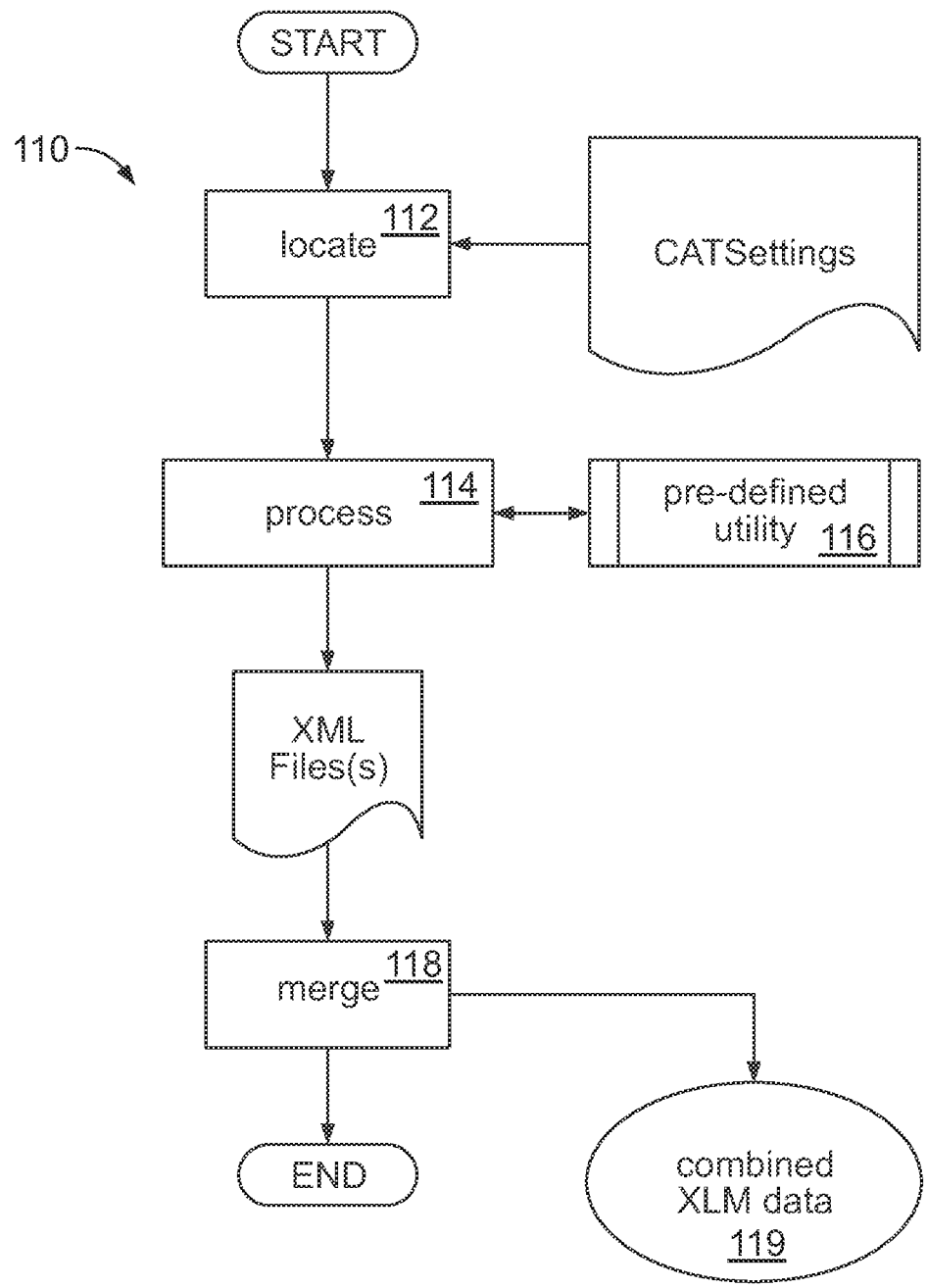
FIG. 5 is an illustration of a high level flowchart showing example operations performed by an administration tool according to one or more embodiments of the present disclosure.
Figure 6:
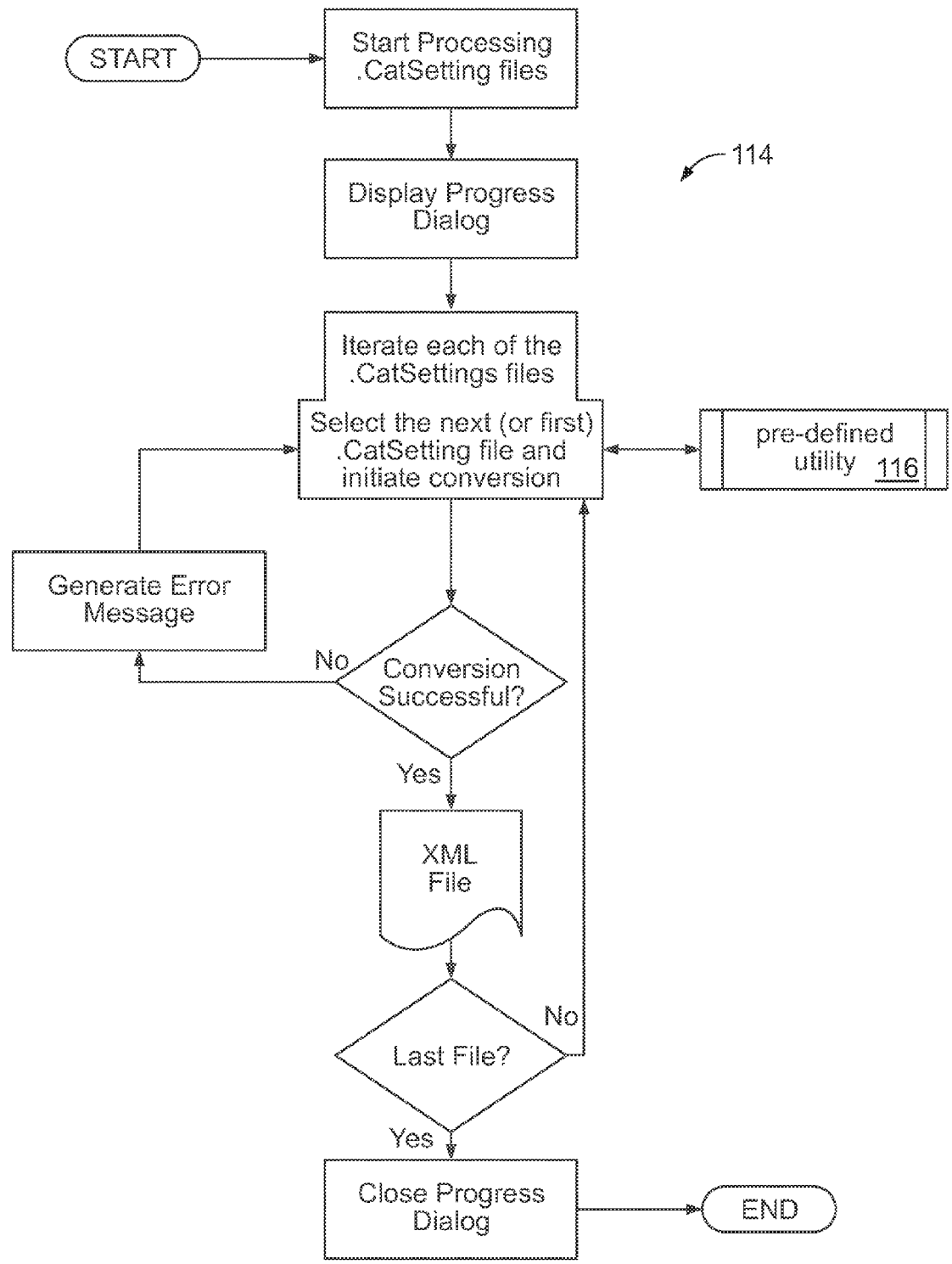
FIG. 6 is an illustration of a high level flowchart showing example operations performed by an administration tool according to one or more embodiments of the present disclosure.

The method 100 may begin with an XML Generation step 110. FIG. 5 shows an illustration of a high level flowchart of an example XML Generation step 110. In this step, the AT 20 may first locate 112 CATSettings that will be analyzed by the AT 20. These CATSettings for example may have been distributed by the makers of CATIA along with a new CATIA software release, or these CATSettings may be old or existing settings, for example, settings that an administrator desires to analyze. These CATSettings may include one or more .CATSetting files, such as, perhaps, a set of .CATSetting files associated with a new software release. In some embodiments, a user can utilize the AT user interface 22 to navigate and select a particular set of CATSettings files. In other embodiments, the AT 20 may scan a memory and find CATSettings files on its own, or it may scan and present likely candidates to a user for selection. Next, the AT 20 may process (processing step 114) the selected CATSettings files to prepare the files' data in a format that is more conducive to manipulation by the AT 20. To execute this processing step 114, the AT 20 may utilize a pre-defined executable utility 116 (for example, CatBatGenXMLSet.exe) created by the makers of CATIA or some other third party to generate XML files that include specific CATIA settings. In one example, the pre-defined utility may only be capable of processing one .CATSetting file at a time, in which case the processing step 114 may result in one XML file for each .CATSetting file in the selected set. FIG. 6 shows an illustration of a more detailed example of the processing step 114. In this example, it can be seen that the .CATSetting files may be iterated one at a time and converted to XML files using a pre-defined utility 116.

One should understand the limited functionality of typical pre-defined CATIA utilities that the AT 20 may employ. Typically, these types of pre-defined utilities merely convert files from one format to another and provide a user with limited or no feedback, graphical information or control. These re-made utilities do not allow a user to view, compare, and/or modify program settings and do not provide tools or documents to correlate CATIA settings with features and/or settings in the CATIA GUI. The AT 20 may include these types of functionalities and more, as further described herein.

Additionally, it should be understood that XML (Extensible Markup Language), as used in reference to XML files and XML data, is only one type of markup language that may be used by the routines, methods and solutions of the present disclosure. For example, HTML is another type of markup language. In general, a markup language defines a set of rules for encoding data in a file in a format that is both human-readable and machine-readable, and files written using a markup language may be referred to as markup language files. Therefore, although the descriptions throughout this disclosure may use XML files and XML data as examples, it should be understood that any reference to XML could also apply to a different type of markup language as well, and no reference to XML should be understood to limit the descriptions herein to only XML.

Once one or more (typically a large number) XML files have been created by the processing step 114, the AT 20 may merge (merging step 118) all the XML/settings data contained in the one or more XML files into a single source of combined XML data 119 that includes all the settings from all the selected XML files. In some embodiments, the AT 20 maintains this single source of XML/settings data in memory without creating a new XML file; however, in other embodiments it may be advantageous for the AT 20 to create one or more temporary XML files.

The next main step of the method 100 may be an XML/Template Merging step 120. In order to fully describe this step, a further description of "GUI path data" is useful, as well as a description of template files. Throughout this disclosure, "GUI path data" refers to information, related to a particular CATIA setting, which indicates a feature or setting in the CATIA GUI (i.e., the CATIA user interface that the end user interacts with to operate the CATIA software program) that is linked to the particular CATIA setting. GUI path data may also be referred to as correlation information. GUI path data can be very helpful to a user that is attempting to change a particular feature within the CATIA GUI when the user does not know which CATIA setting relates to that feature. Before the solutions of this disclosure, a user that wanted to change a particular feature may have scanned through thousands of cryptic CATIA setting names looking for one that appeared to relate to the feature that the user wanted to change. Then, the user likely changed a setting, restarted the CATIA software program and checked to see if the feature had changed. The solutions of this disclosure drastically reduce the time required by this "guess and check" method.

Template files provide many benefits to the AT 20. Template files are pre-defined files used by the AT 20 that facilitate easy comparison and management of CATIA settings. In some embodiments, each template file may contain all of the model CATIA settings (perhaps more than 3,000 settings), including values for each setting, that are required for an installation of the CATIA software to operate as required. Additionally, several template files may exist to accommodate the different uses that a company, for example, may have for the CATIA software. A company may maintain a separate template file for each group, division or use of the CATIA software. For example, a company may maintain one template file for enterprise use, one template file for CITRIX use and so on. Each template file can be used to track settings that should be propagated into each group, division or use. Furthermore, access to template files may be limited to only a select group of employees or administrators such that only authorized people may propagate changes to model settings.

Template files may also maintain "GUI path data" for one or more CATIA settings. In some embodiments of the present disclosure, a template file may maintain "GUI path data" (also referred to as correlation information) for each CATIA setting maintained in the template file. As explained above, because there is often no obvious correlation between CATIA setting names and the CATIA GUI features that they control, populating GUI path data for over 3,000 CATIA settings may require extensive and creative testing, by a team of engineers for example. This testing may include the observing CATIA GUI changes that occur when certain CATIA settings are changed, as well handling the interrelationships between multiple CATIA settings changes. For example, an engineer may have to consider whether multiple CATIA settings changes are compatible to operate the CATIA GUI in a desired manner.

Figure 7:
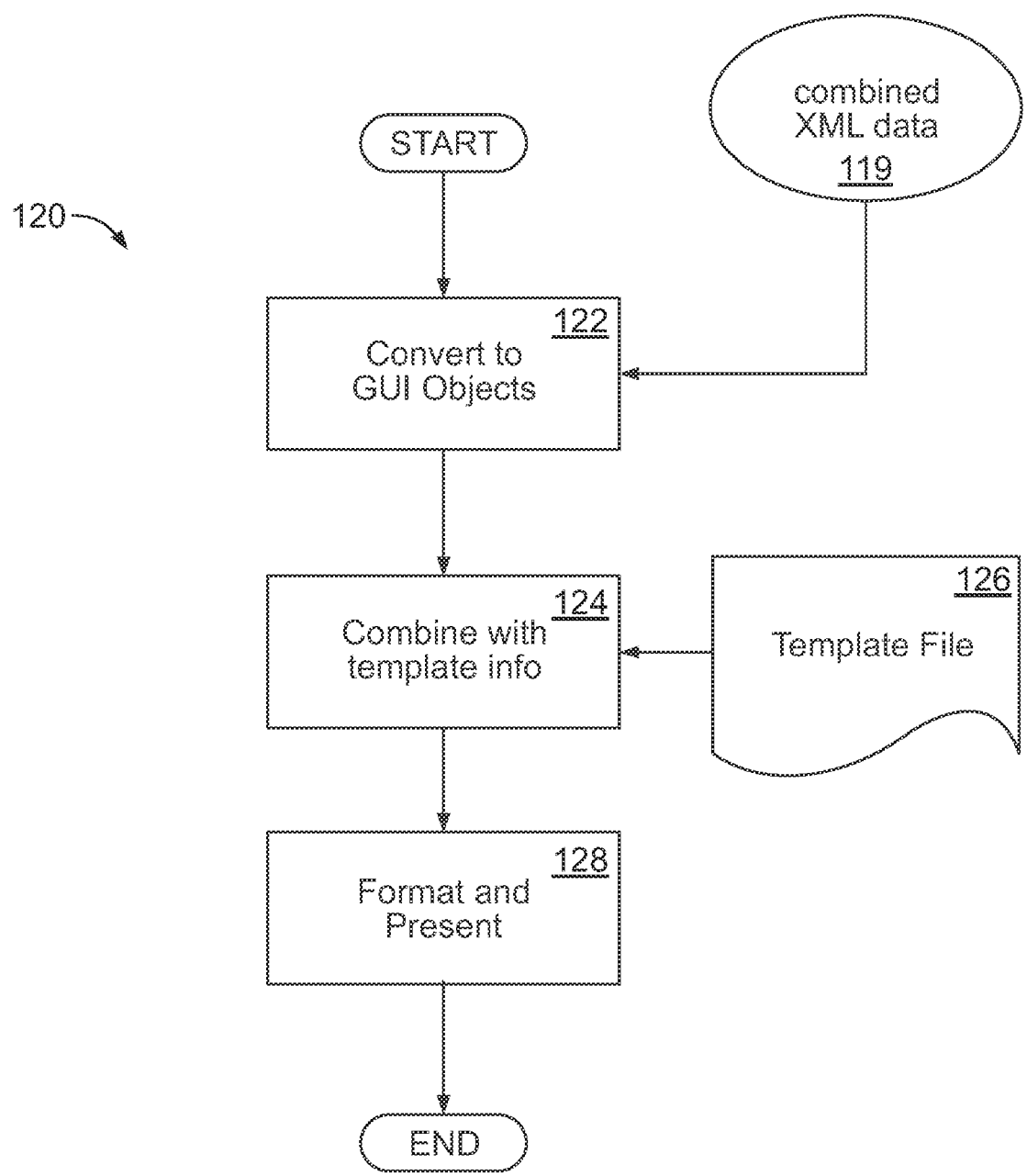
FIG. 7 is an illustration of a high level flowchart showing example operations performed by an administration tool according to one or more embodiments of the present disclosure.

With the descriptions of GUI path data and template files laying a foundation, the following will describe an example XML/Template Merging step 120, whereby the AT 20 merges the combined XML data 119 generated by XML Generation step 110 with a selected template file and presents the merged information to a user or administrator via the AT user interface 22 (see FIG. 3). FIG. 7 shows an illustration of a high level flowchart of an example XML/Template Merging step 120. First, the AT 20 may convert 122 the XML data 119 to GUI objects that are formatted to control the display of the AT user interface 22. It should be understood that the XML data 119 may be converted 122 to GUI objects after the merging step 118 has completed, or the XML data 119 may be converted 122 to GUI objects as part of (or alongside) the merging step 118.

Figure 8:
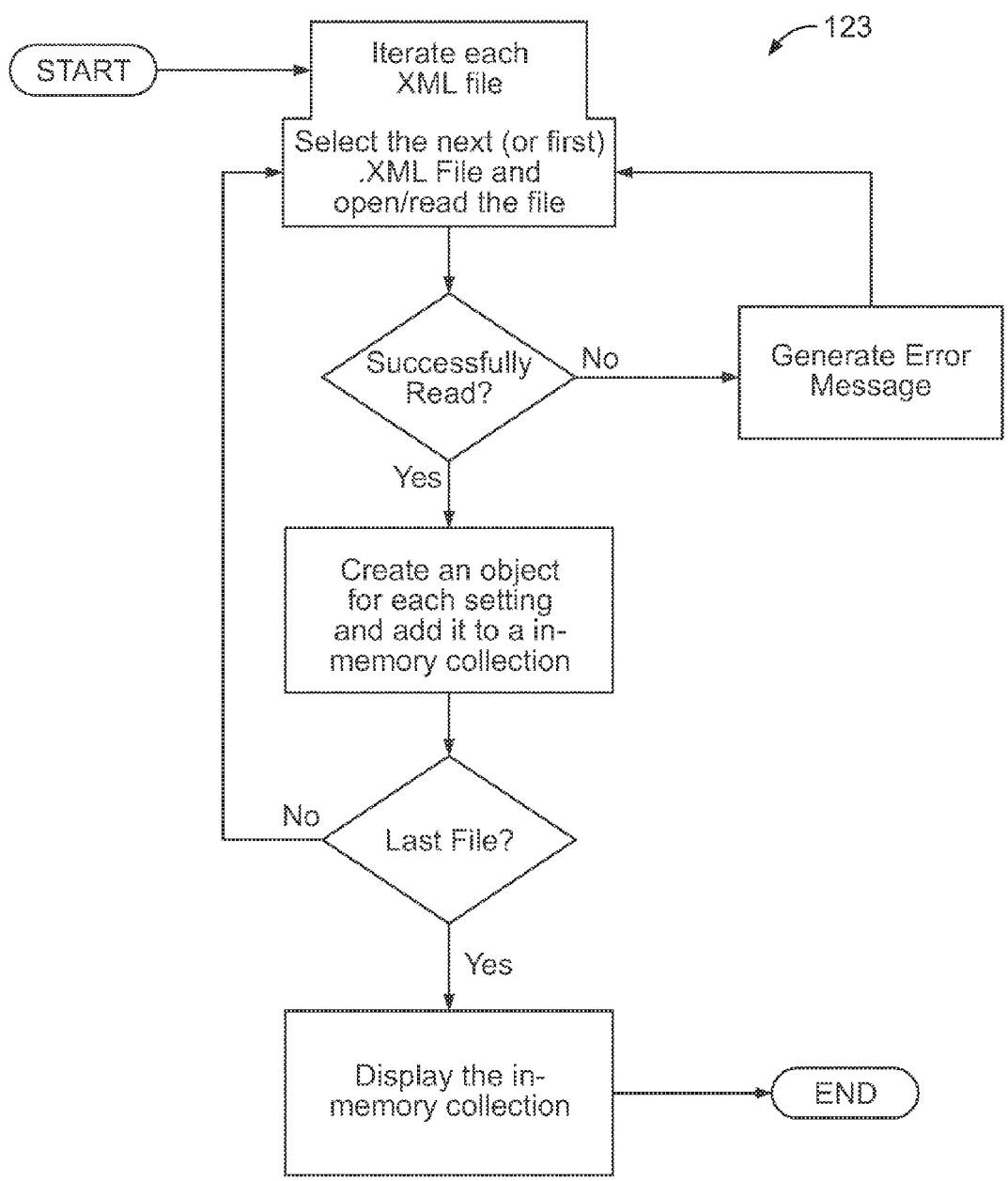
FIG. 8 is an illustration of a high level flowchart showing example operations performed by an administration tool according to one or more embodiments of the present disclosure.

FIG. 8 shows an illustration of an example conversion routine 123 that shows how the settings in each XML file may be converted to GUI objects. In this example, the XML files are iterated, and one at a time each XML file is converted to a GUI object and then added to the combined data that is formatted to control the display (the "in-memory collection").

Referring again to FIG. 7, the XML/Template Merging step 120 may also include a step that combines 124 the GUI objects with information from a selected template file 126, such as settings, values, "GUI path data" and perhaps other information. Finally, the AT 20 may format for display (to the extent it was not formatted in previous steps) all of the merged information from the XML data and the template file along with additional GUI data and present a display (for example a grid-style display) to a user or administrator via the AT user interface 22.

Figure 9:
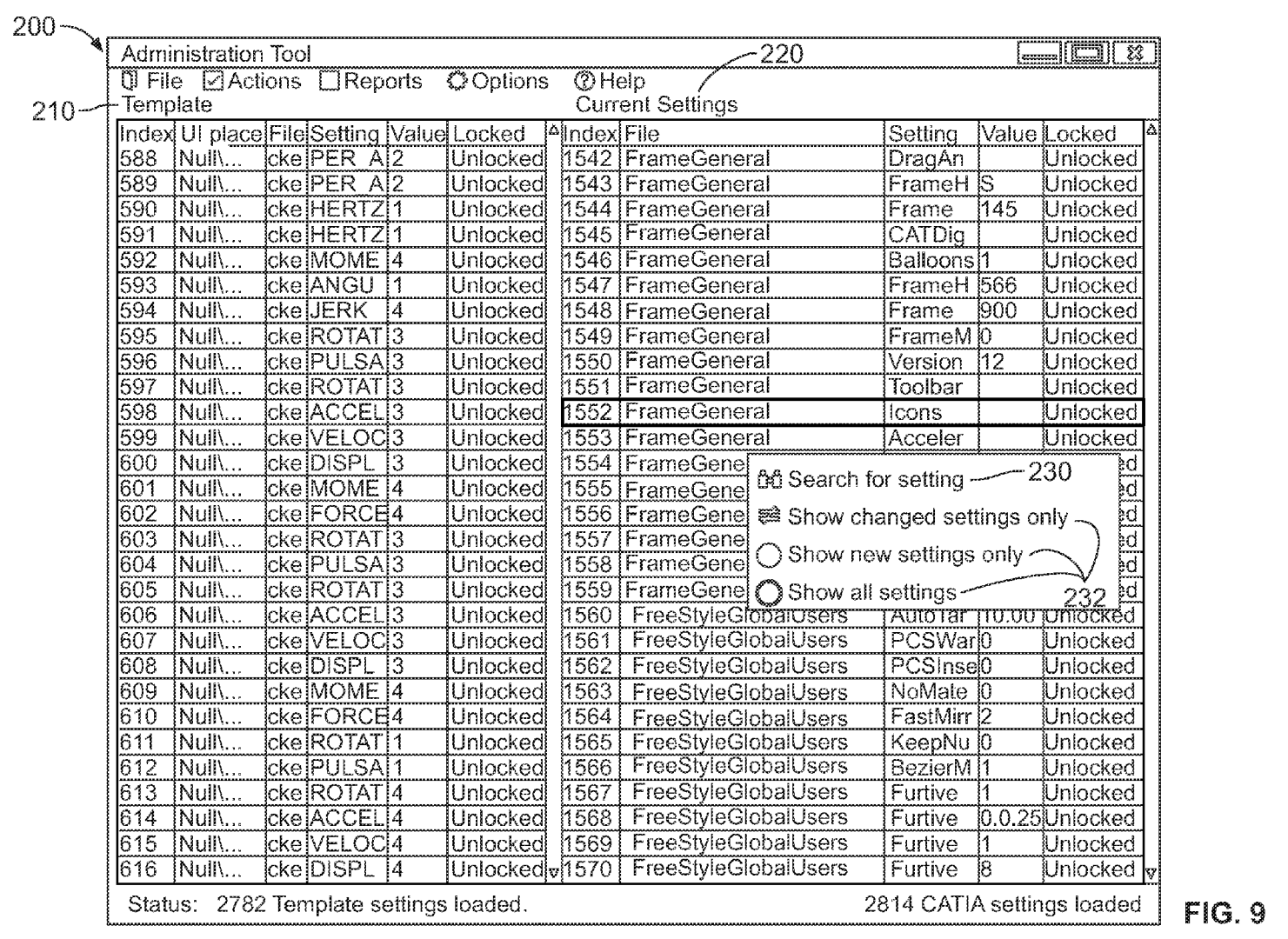
Figure 10:
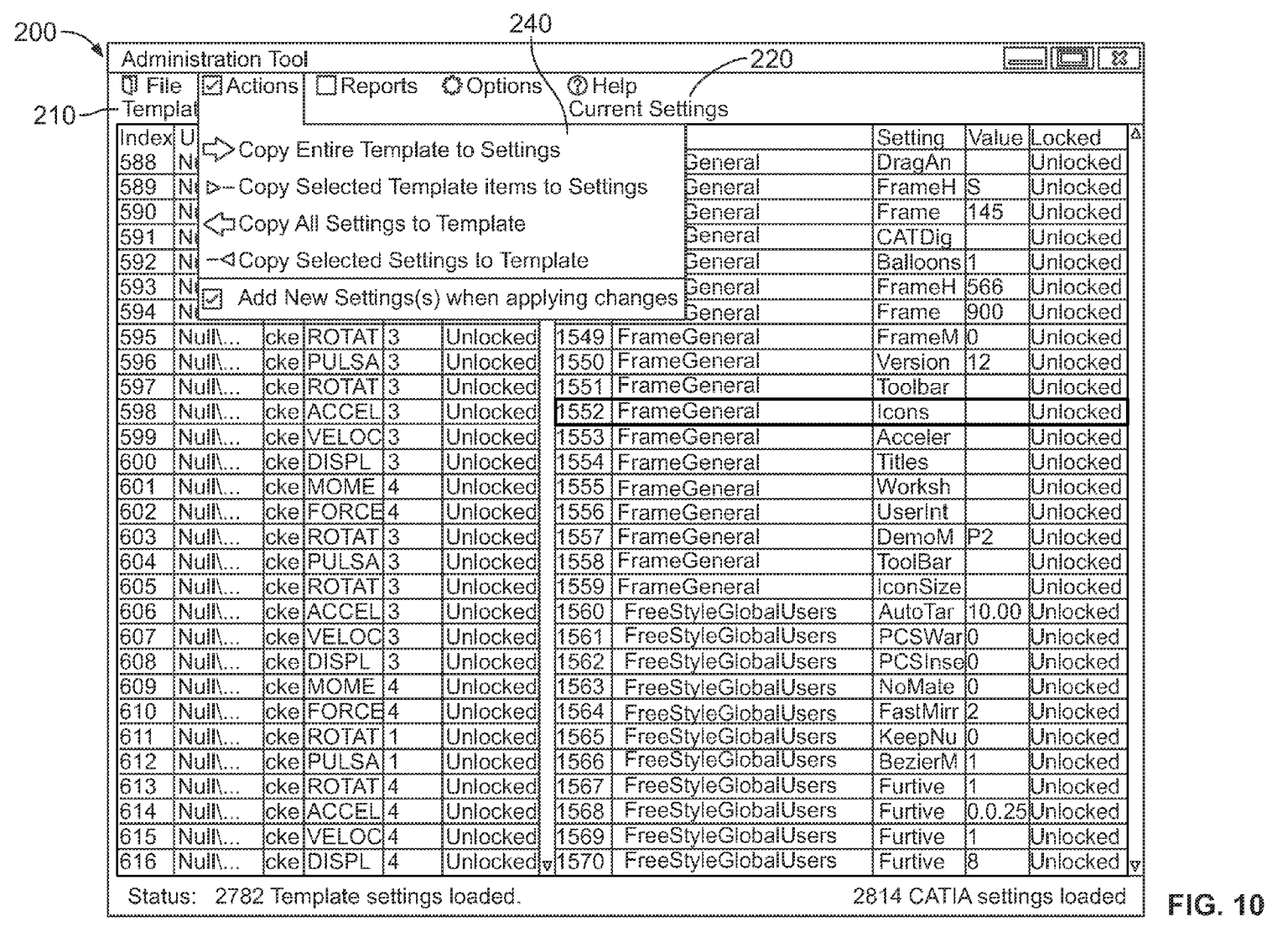

FIGS. 9 and 10 show two illustrations of an example display 200 (for example, a screen shot) that a user of the AT 20 may see once the XML/Template Merging step 120 has executed. The display 200 may include one or more visual grids where each includes one or more boxes or "fields" that include information. The visual grid on the right labeled "Current Settings" (current settings grid 220) includes one or more boxes or "fields" that have been populated by XML data 119 from the converted CATSettings files. The visual grid on the left labeled "Template" (template grid 210) includes one or more "fields" that have been populated with information from a template file 126. For each visual grid, each row in the grid represents one CATIA setting, and each row further displays additional information about the CATIA setting. For example, for the Current Settings, additional information is displayed such as the XML file the setting originated from, the setting name and the setting value. Likewise, for the Template, additional information is displayed such as the setting name, the setting value and the "GUI path data" for the setting. In FIGS. 9 and 10, the GUI path data entries for each row are shown as "Null," but in real operation of the AT 20, a user may see an indication of the location of a feature or setting in the CATIA GUI. In some embodiments, the AT user interface 22 also includes interactive functionalities associated with the GUI path data entries. For example, a user may be able to double click a GUI path data entry, and in response, the AT user interface 22 may display more detailed location information, or it may initiate loading of the CAITA GUI, thereby showing, directly, the location of the feature within the CATIA GUI that is controlled by the setting.

The next main step of the method 100 may be a Comparison and Modification step 130. In this step, a user can view and edit the combined XML and Template information via the AT User Interface 22. The AT 20 may allow a user to choose from several optional actions that may initiate routines within the AT 20 and may present status information and updated results to the user via the AT user interface 22. As one choice, the user may view and compare the template grid 210 and the current settings grid 220. The AT user interface 22 may include an interactive scrolling feature for each grid, whereby the user can quickly scroll through the multitude of settings displayed in each grid. One benefit of AT 20 is that a user can compare CATIA settings from a comprehensive template file to CATIA settings from a large number of .CATSetting files all in one place. By contrast, some previous solutions to deal with CATSettings changes merely allowed one by one comparison of .CATSetting files.

Figure 11:
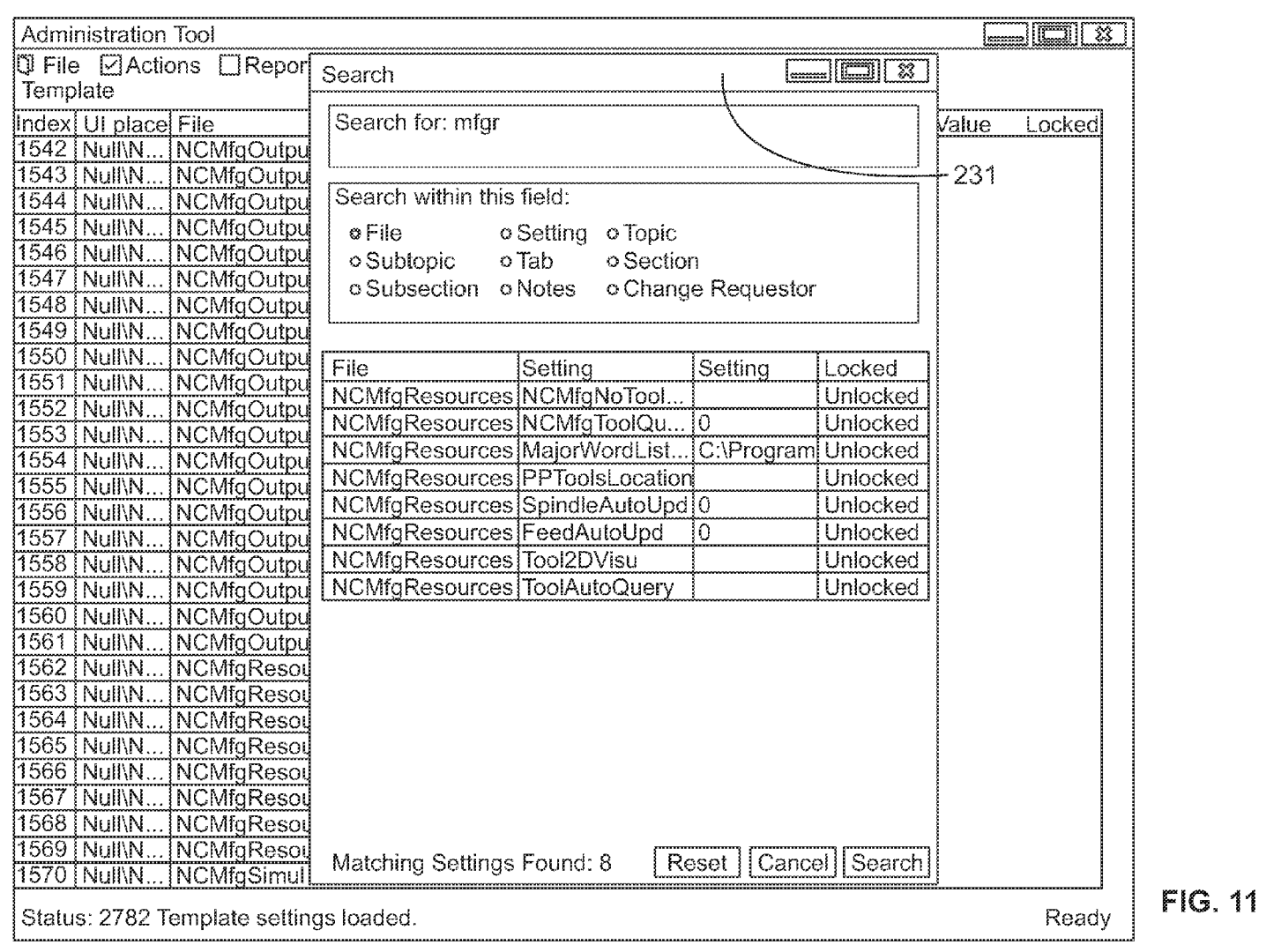

The AT user interface 22 may also include a set of features that may aid a user in viewing and/or comparing settings. In some embodiments, the AT user interface 22 may include a search feature 230 (see FIG. 9) that enables a user to search (for example by keywords) one or more fields of grids 210, 220. For example, if a user discovers a CATIA setting using the CATSettings GUI (part of CATIA), the user could search the AT user interface 22 to find that setting. In another example, a user may only know a general name or identifier for the setting they want to change, and the AT user interface 22 will allow the user to search for probable matches. FIG. 11 shows an illustration of an example search window 231 that may pop up when the user selects the search feature 230. The search window 231 may allow a user to enter a string to search for and may allow the user to select one or more particular fields to search. In some embodiments, the AT user interface 22 may also include viewing (or highlighting) features 232 (see FIG. 9) that enable a user to view a subset of settings (or highlight settings) that have been changed. For example, a user could choose to view or highlight settings that have been added or changed to the "Current Settings" (the imported CATSettings/XML data) since the selected template file was created.

One specific beneficial use of the described viewing and comparing features is that a user could use the AT 20 to compare CATIA settings from different CATIA software program releases. For example, if a user had access to a set of CATSettings for release A and a set for release B, the user could import the set of CATSettings for release A using the AT user interface 22 and then save those CATSettings as a template file. Then, a user could import the set of CATSettings for release B and compare them to the template file previously created from the release A CATSettings.

As part of the Comparison and Modification step 130, the AT 20 may also give a user the option to modify the settings of the template grid, the current settings grid or both by changing the values (and/or other information) associated with particular settings. For example, a user may utilize the AT user interface 22 to double click a value, thereby initiating an edit window to pop up. In another example, the user may single click or slowly click twice on a value to activate a cursor, thereby allowing the user to quickly edit the value. The AT 20 may also give a user the option to delete settings or add settings along with associated information form and to the template grid, the current settings grid or both. For example, the user may choose these options from the "File" menu within the AT user interface 22. The AT 20 may also give a user various other options accessible by the AT user interface 22 such as the option to enter or change management notes, the option to enter or change GUI path data and perhaps the option to generate reports that can be saved or printed.

Figure 12:
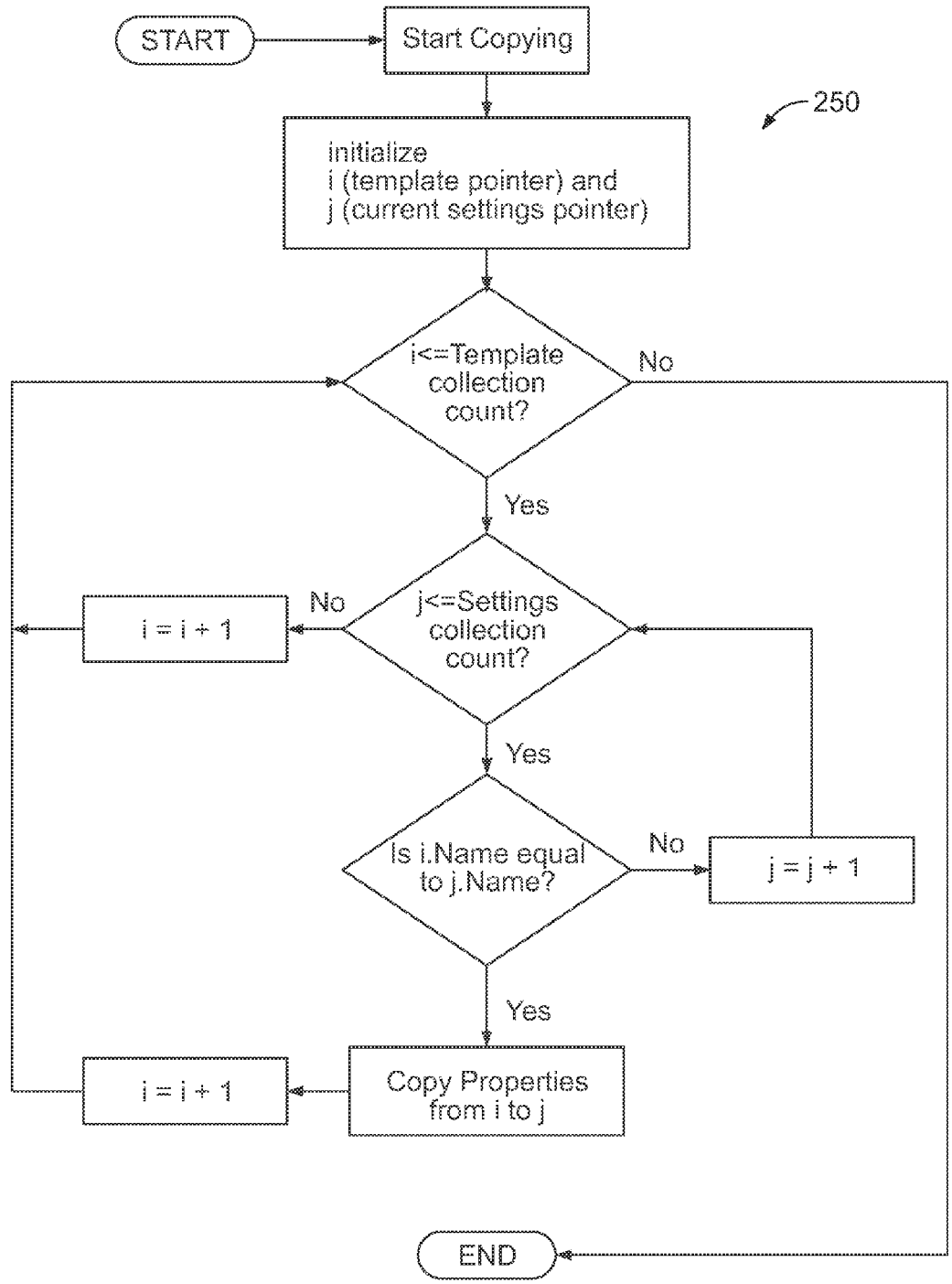
FIG. 12 is an illustration of a high level flowchart showing example operations performed by an administration tool according to one or more embodiments of the present disclosure.

In some embodiments of the present disclosure, the AT 20 may also give a user one or more copy options 240 (see FIG. 10) to quickly copy settings (and associated information) between the template grid and the current settings grid. For example a user could copy one or more settings from the template to the current settings and vice versa. FIG. 12 shows an illustration of a flow diagram 250 that further details how such a copy routine may execute. In this example routine, the user may have, for example, chosen to copy one or more settings from a template grid to a current settings grid. The routine may then iterate through the selected rows of template settings to copy, and if the routine identifies certain settings as being of the same type as in the current settings grid, it may copy over the properties or associated information of that template setting to the corresponding setting in the current settings grid.

By using one or more of these modification options, the user can modify the current settings grid, the template grid, both or neither. In general, the user may change the template grid if the user intends to create a new template file, and the user may change the current settings grid if the user intends to propagate new CATIA settings that are different than the settings included in a new CATIA software program release.

Figure 13:
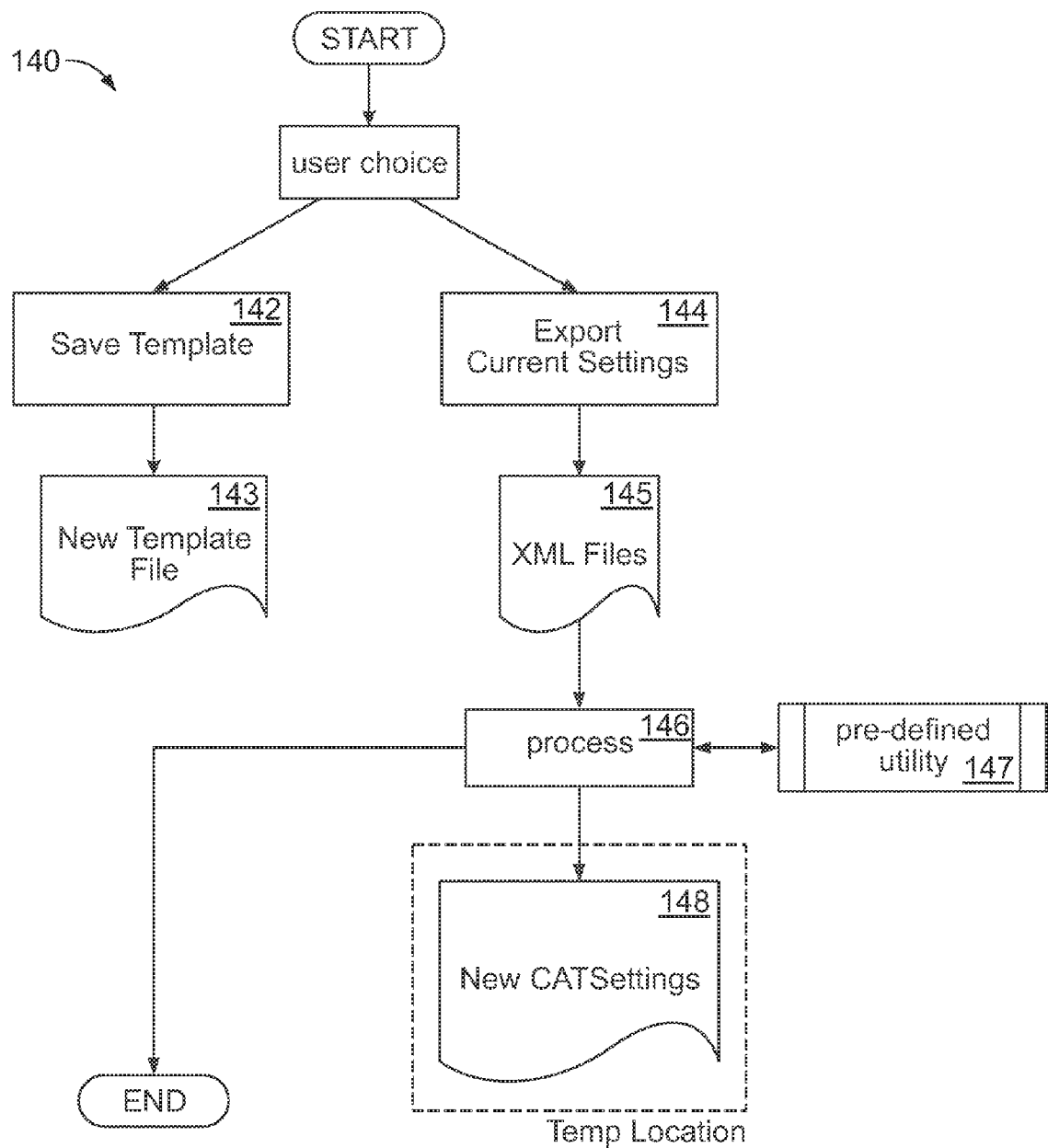
FIG. 13 is an illustration of a high level flowchart showing example operations performed by an administration tool according to one or more embodiments of the present disclosure.

Once a user is done comparing and modifying settings via the AT user interface 22, the user may initiate the next main step of the method 100, such as an Export and File Conversion step 140. FIG. 13 shows an illustration of a high level flowchart of an example Export and File Conversion step 140. In this step, the user has two main options, and the user could choose to execute one option, both or neither. As a first main option, the user could choose to save 142 a new template file 143 created from the information shown in the template grid 210 of the AT user interface 22. An exemplary template file may store information regarding the configuration of multiple CATIA settings, GUI path data and detailed notes for future use, all in a single format. Newly created template files may be stored to special/restricted shared network location(s), where only a limited group of people (such as administrators) involved in the CATIA setting manipulation process may have access. Additionally, the AT 20 may help to avoid incidental loss of old template files. In some embodiments, when a new template file is generated, it does not override existing template files, but instead it is saved as a new file, for example named with specific information such as the time of creation and the name of the user that created it. In other embodiments, the Tool may be configured to overwrite old/existing template files.

As another main option of the Export and File Conversion step 140, the user could choose to export (export step 144) (see FIG. 13) the information shown in the current settings grid 220 of the AT user interface 22. In one embodiment of the present disclosure, when the user chooses to export (export step 144) the current settings, the AT 20 may create a new set of XML files 145 that contain CATIA settings associated with all the current/desired settings of the CATIA program. The export step 144 may also use GUI object information from the current AT user interface 22 setup to create each XML file. In some embodiments, the AT 20 may create one XML file for each original CATSettings file that was processed (processing step 114) (see FIG. 5) in the XML Generation step 110. Furthermore, in some embodiments, because the XML files that are created during the export step 144 are only used temporarily, the AT 20 may delete previous sets of temporary XML files before or after the new set of XML files 145 is created.

Figure 14:
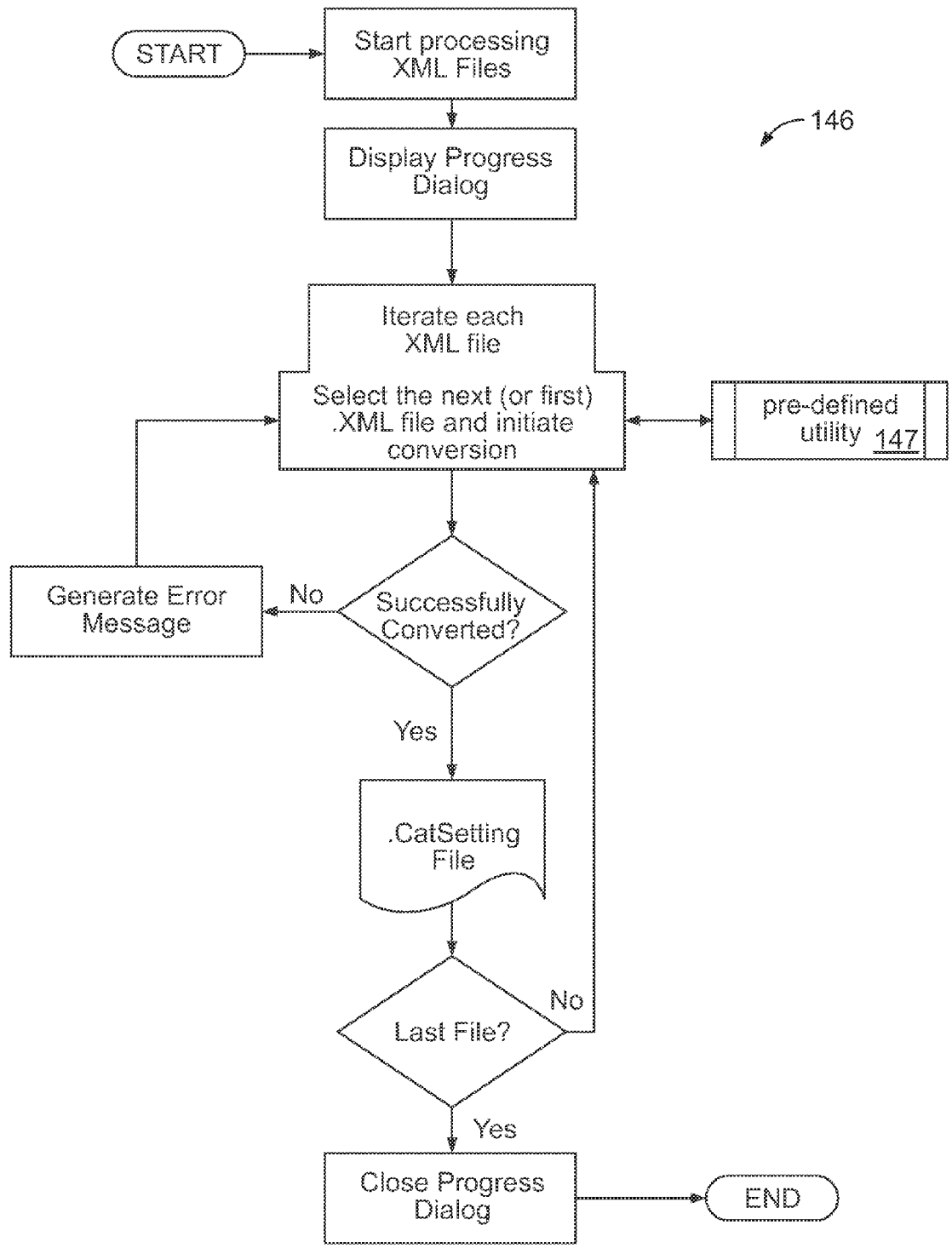
FIG. 14 is an illustration of a high level flowchart showing example operations performed by an administration tool according to one or more embodiments of the present disclosure.

Once a new set of XML files 145 has been created, the AT 20 may process (processing step 146) all the XML files 145 in the set to prepare the files' data in a format that is readable by the CATIA software program. To execute this processing step 146, the AT 20 may utilize a pre-defined executable utility 147 (for example, CatBatImpXMLSet.exe) created by the makers of CATIA or some other third party to convert XML files into .CATSetting files that may contain one or more CATSettings. In one example, the pre-defined utility may only be capable of processing one XML file at a time, in which case the processing step 146 may result in one .CATSetting file for each XML file in the set. FIG. 14 shows an illustration of a more detailed example of the processing step 146. In this example, it can be seen that the XML files may be iterated one at a time and converted to .CATSetting files using a pre-defined utility 147.

In some embodiments, the AT 20 stores these new CATSettings files in a temporary memory location either on a client machine or on a network-connected administrator machine. The new CATSettings files are then ready (waiting in a temporary location) to replace the current/existing CATSettings files that control how an installation of the CATIA software program looks and operates.

Figure 15:
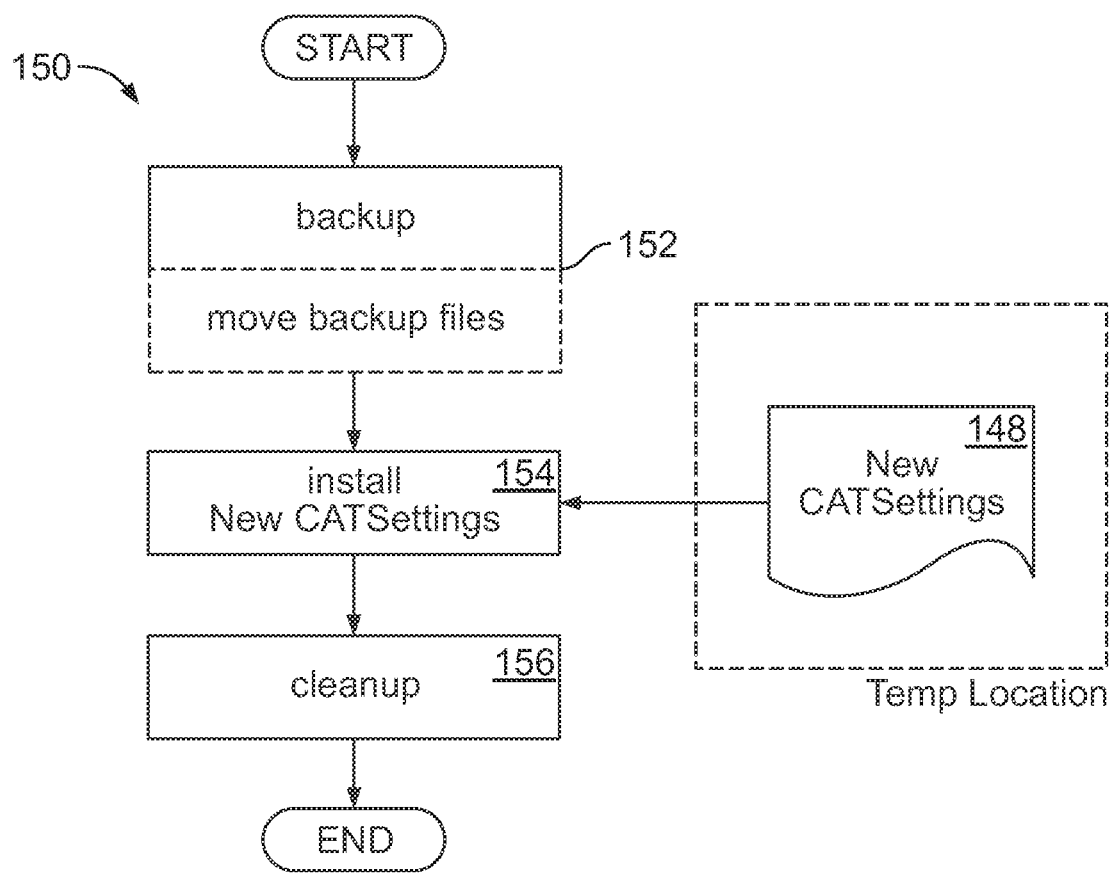
FIG. 15 is an illustration of a high level flowchart showing example operations performed by an administration tool according to one or more embodiments of the present disclosure.

The next main step of the method 100 may be a New Settings Installation step 150. Once the new .CATSetting files are created, they can either be incorporated into a new release of the CATIA software that may be distributed to end users, or the AT 20 can force changes to the CATIA settings for an installation of the CATIA software program that is currently installed on a local machine. FIG. 15 shows an illustration of a high level flowchart of an example New Settings Installation step 150. In this step, the AT 20 may first backup 152 the old CATSettings by coping, moving or renaming the old CATSettings files. In one example, the AT 20 may rename all of the current CATSettings files, where each file originally includes the file extension .CATSetting, to change the file extension of each file to .CATSetting.OldVersion. Additionally, or instead of renaming the files, the AT 20 may move the old CATSettings files to a different memory location where old CATSettings files are maintained. In some embodiments, this old settings memory location may be a sub directory or location within the default location where current/active CATSettings are stored.

Next, the AT 20 may install 154 the new CATSettings by moving or copying the new CATSettings files 148, created during the Export and File Conversion step 140, from a temporary location, for example, to the default location where the CATIA software program looks to find CATSettings files. Typically this default location will be the same memory location where the old settings where located, for example, before they were renamed, copied or moved. Additionally, the AT 20 may perform one or more "cleanup" routines 156 once the new CATSettings files are installed. For example, the cleanup routine(s) 156 may include removing or deleting temporary files to the extent that they were not removed during previous steps of the method 100.

The other main sub-tool of the SSMT 10 is the client tool (CT) 30 (see FIG. 1). The CT 30 may be run by the end user of a client machine where a client CATIA software program has been installed. In order to describe the functionality of the CT 30, an explanation is useful of what happens when a version of the CATIA software program is installed on or "pushed" to a client machine. Pushing generally refers the process whereby a network-connected administration machine that has been granted authority may initiate a download of a software program or application byto a client machine, for example from an administration machine. When a new version of the CATIA software program is installed on or "pushed" to a client machine, before the new .CATSetting files are installed, the installation tool may first erase, delete or move away all of the .CATSetting files that are currently controlling the CATIA software program installed on the client machine. This means all of the end user's personal CATIA settings may be lost, and this may create problems for many users. For example, some departments or organizations within a company may maintain certain settings requirements in addition to the ones required by the company. Without a client tool (CT) 30, the end user may have to go through a lengthy process of manually resetting all of his or her personal (or department-required) preferences each time a new software version is installed.

With the CT 30, an end user may be able to save his or her personal CATIA settings before an installation tool deletes all of the current CATSettings. This process of saving end user preferences is sometimes referred to as creating a "snapshot file." These snapshot files may be similar to template files, as described in relation to the AT 20, in that the snapshot files contain CATIA settings that are desired by a user, but are not yet incorporated into an active set of CATSettings files. Then, once the installation tool installs the new CATSettings, the end user may use the CT 30 to restore his or her personal settings from a snapshot file, thereby restoring CATIA settings to the state they were in when the snapshot file was created. Accordingly, the CT 30 may include two main processes, routines or options: (1) creating a backup (snapshot file) with personal settings, and (2) restoring personal settings from a snapshot file and applying the personal settings to an active set of CATSettings.

Figure 16:
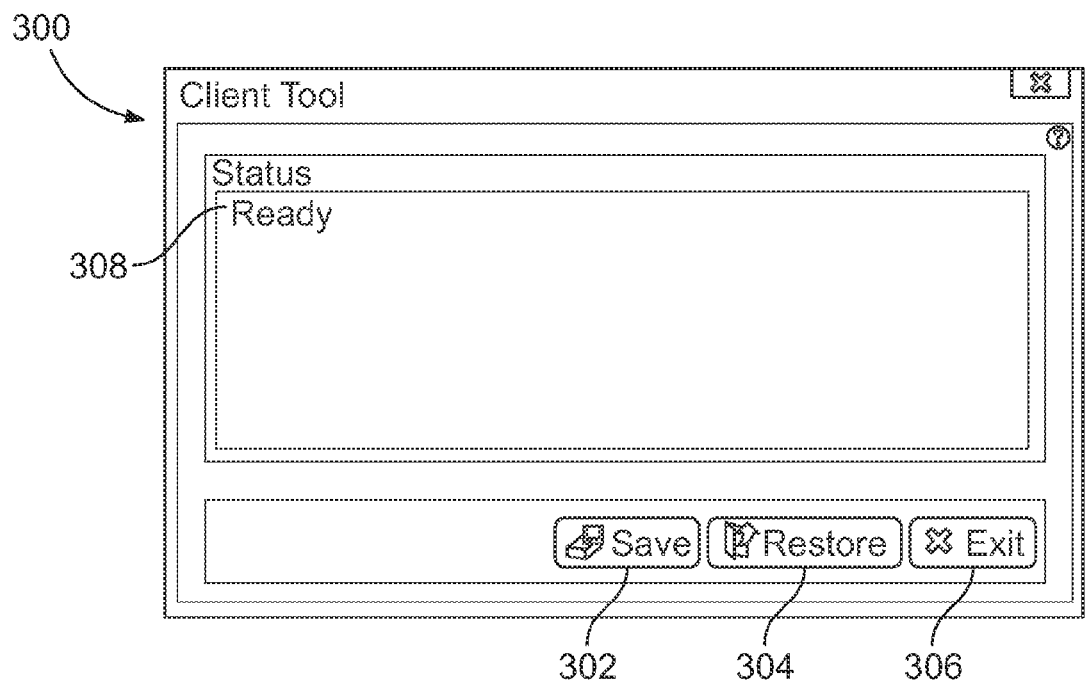
FIG. 16 is an illustration of an example display that may be related to a client tool according to one or more embodiments of the present disclosure.

The CT 30 may also include a CT user interface that interacts with a user by communication with a visual display and perhaps other peripheral devices. The CT 30 may allow an end user to initiate various routines such as creating snapshot files and restoring settings from a snapshot file to an active set of CATSettings. FIGS. 16, 17, 18 and 20 show illustrations of example displays (for example, screen shots) that an end user of a CT 30 may see. FIG. 16 shows an illustration of an example display 300 of a CT user interface that an end user may see when he or she starts the CT 30 for the first time. As shown, the CT 30 indicates, in the "Status" area 308, that the tool is "Ready" for the user to choose an action. In this example, the end user may choose to create ("Save" 302) a snapshot file, "Restore" 304 settings from a snapshot file or "Exit" 306. It should be understood that other embodiments of the CT 30 may present the user with additional options or less options than are shown in FIG. 16.

Figure 17:
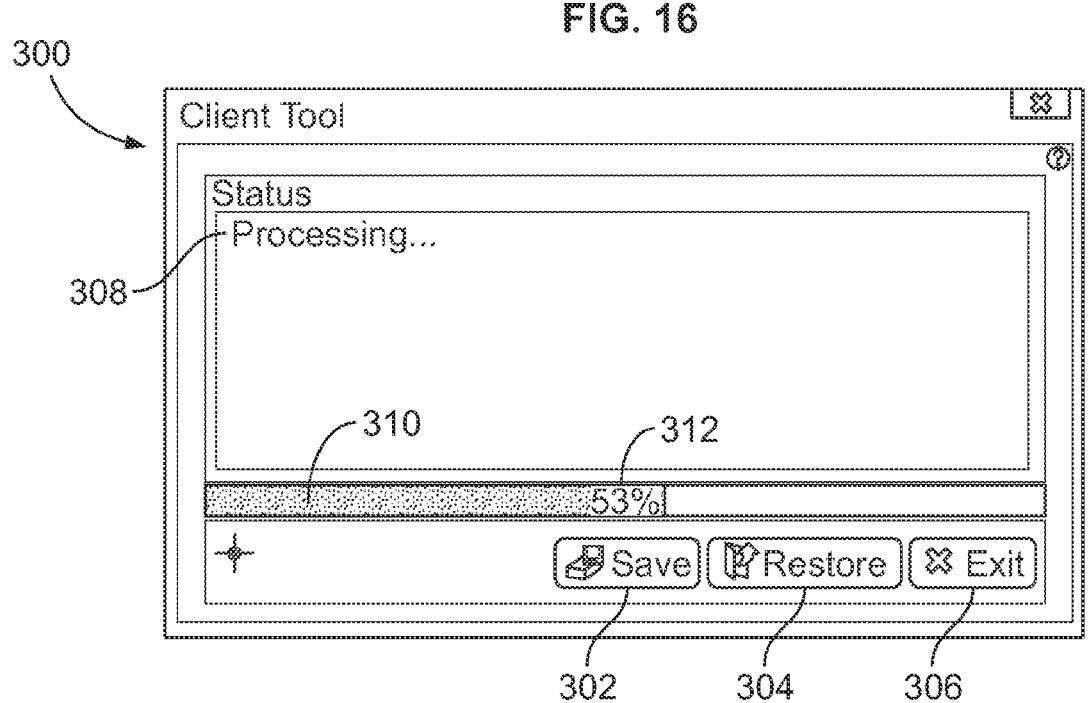
FIG. 17 is an illustration of an example display that may be related to a client tool according to one or more embodiments of the present disclosure.
Figure 20:
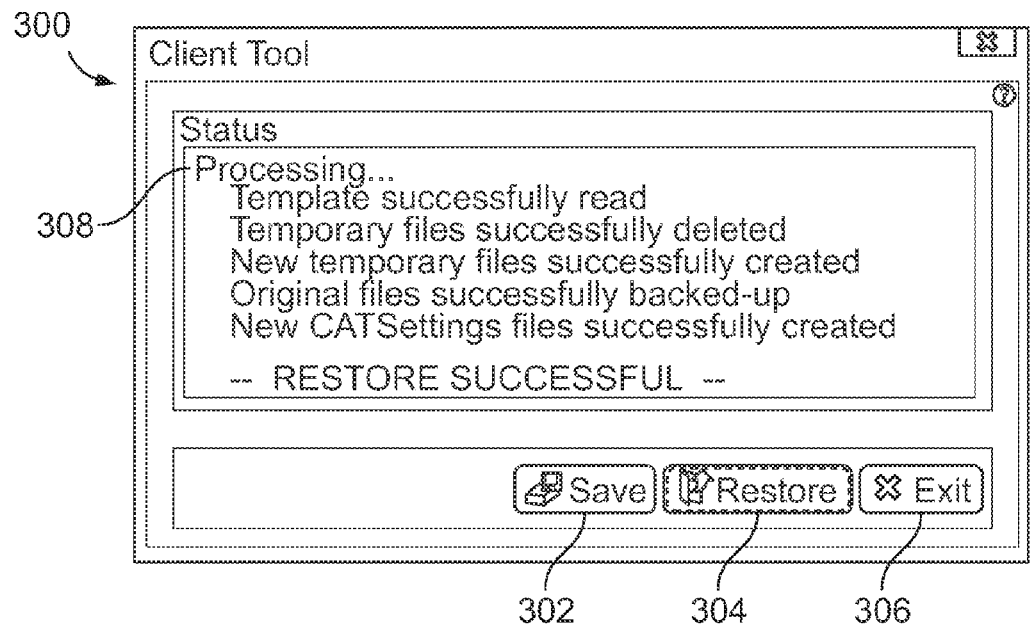
FIG. 20 is an illustration of an example display that may be related to a client tool according to one or more embodiments of the present disclosure.

FIG. 17 shows an illustration of an example display 300 of a CT user interface that an end user may see when he or she is initially waiting for a "Save" action, a "Restore" action or some other action to progress. As an action progresses, the end user may see a progress bar 310 that appears to fill in from left to right, and perhaps a percentage indicator 312. Additionally, as an action progresses, the end user may see status messages accumulate in the Status area 308. FIG. 17 shows only a single status message ("Processing") in the Status area 308, but it should be understood that any number of status messages may appear as the action progresses, either replacing old status messages or appearing in conjunction with old status messages. In some embodiments, when the current action is complete, the progress bar 310 and percentage indicator 312 may disappear, as can be seen in FIGS. 18 and 20.

Figure 18:
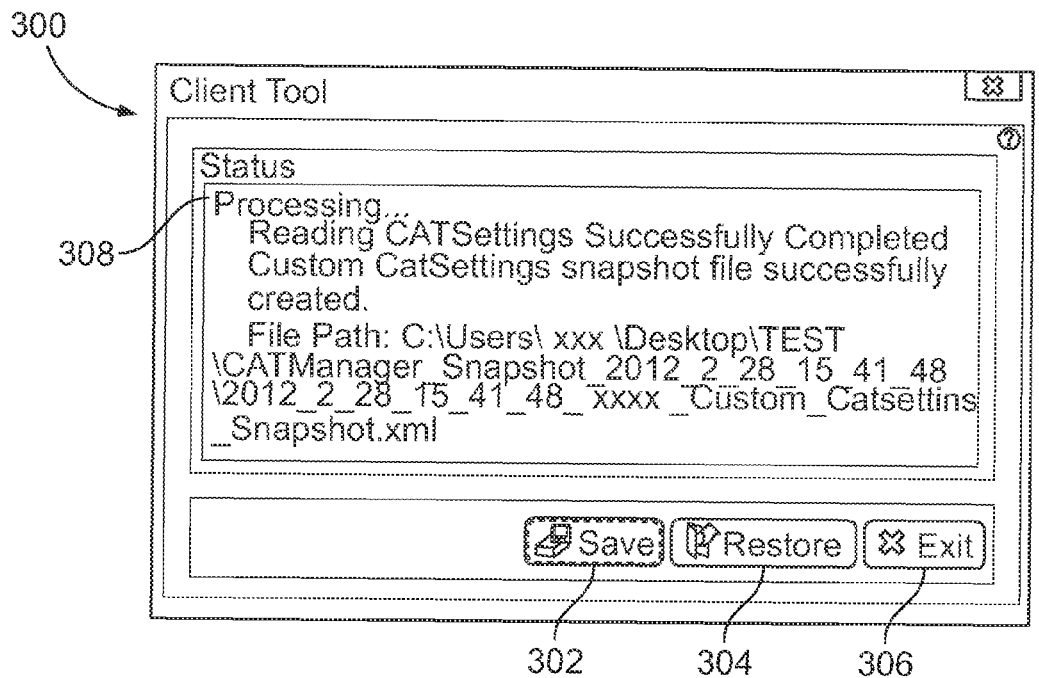
FIG. 18 is an illustration of an example display that may be related to a client tool according to one or more embodiments of the present disclosure.

Regarding the first main routine of the CT 30, the backup routine, FIG. 18 shows an illustration of an example display 300 of a CT user interface that an end user may see after the end user selected to create a snapshot file ("Save" 302). In some embodiments, the user may be presented with an option or a window whereby the user can choose a memory location or a directory where the snapshot file will be saved. As can be seen in the status messages in the status area 308, when the CT 30 starts to create a snapshot file, the CT 30 first reads the current state of the active CATSettings, for example, as they are configured on the end user's client machine. Next, the CT 30 creates a snapshot file that includes all the CATIA settings that the end user wants to preserve, so that the end user may restore one or more of these saves settings after a new version of the CATSettings have been installed. It should be understood that the CT 30, including the CT user interface, may include additional options whereby an end user can fine tune exactly which CATIA settings the user wants to preserve. In other embodiments, the CT 30 may make "smart choices" as to which user settings should be saved, or perhaps which settings the user may have authority to preserve. Finally, the display 300 indicates to the end user a location (for example a memory or directory path to a local folder) where he or she may find the newly created snapshot file.

It should be understood that, in order to execute one or more of its routines, the CT 30 may utilize one or more pre-defined executable utilities created by the makers of CATIA or some other third party. For example, the CT 30 may, like the AT 20, use a pre-defined utility to convert CATIA files of a proprietary format to files of a format that is easier for CT 30 to read and manipulate, and CT 30 may also use a pre-defined utility to convert manipulated files back to CATIA files of a proprietary format, files that may directly control how the CATIA program looks and operates.

Figure 19:
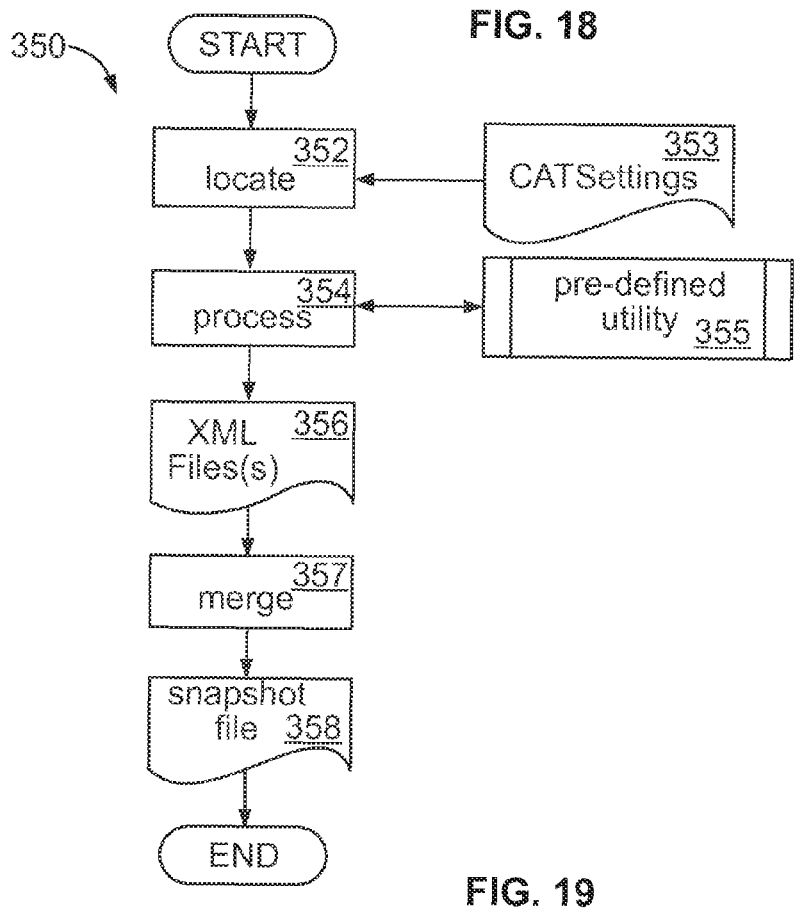
FIG. 19 is an illustration of a high level flowchart showing example operations performed by a client tool according to one or more embodiments of the present disclosure.

FIG. 19 shows an illustration of a flow diagram depicting an example backup routine 350. As shown, the backup routine 350 may first locate 352 CATSettings files 353 that will be analyzed by the CT 30. These CATSettings for example may have been installed at a previous time as part of a CATIA software installation, and may have been modified additionally by an end user. These CATSettings may include one or more .CATSetting files, such as perhaps a set of .CATSetting files associated with a CATIA software installation. In some embodiments, a user can utilize the CT user interface to navigate and select a particular set of CATSettings files. In other embodiments, the CT 30 may scan a memory and find CATSettings files on its own, or it may scan and present likely candidates to a user for selection. Next, the CT 30 may process (processing step 354) the selected CATSettings files 353 to prepare the files' data in a format that is more conducive to manipulation by the CT 30. To execute this processing step 354, the CT 30 may utilize a pre-defined executable utility 355 (for example, CatBatGenXMLSet.exe) created by the makers of CATIA or some other third party to generate XML files 356 that include specific CATIA settings. In one example, the pre-defined utility may only be capable of processing one .CATSetting file at a time, in which case the processing step 354 may result in one XML file 356 for each .CATSetting file in the selected set.

Once one or more (typically a large number) XML files have been created by the processing step 354, the CT 30 may merge 357 all the XML/settings data contained in the one or more XML files 356 into a single source of combined XML data that includes all the settings from all the selected XML files 356. Then, the combined XML data may be used to create a single snapshot file 358 which may be saved to a memory location such as a local directory on the client machine to which the end user has access. In some embodiments, the snapshot file is an XML file, although other types of markup language formats are possible. Additionally, in some embodiments, it may be advantageous to create more than one snapshot file to store the combined XML data.

FIG. 20 shows an illustration of an example display 300 of the CT user interface that an end user may see after the end user selected to restore 304 settings from a snapshot file. As can be seen in the status messages in the status area 308, the CT 30 first reads the end user's snapshot file (or "Template"). In some embodiments, the CT 30 may give the user an option to select from multiple snapshot files, and in other embodiments, the CT 30 may select one default (perhaps the latest) snapshot file. Next, the CT 30 may create one or more temporary or backup files in order to preserve the new (default) set of CATSettings, for example, in case the user's preserved settings from the snapshot file do not work well with a new version of CATIA. Finally, the CT 30 creates a new set of CATSettings files by combining the new (default) set of CATSettings with the end user's preserved settings from the snapshot file.

Figure 21:
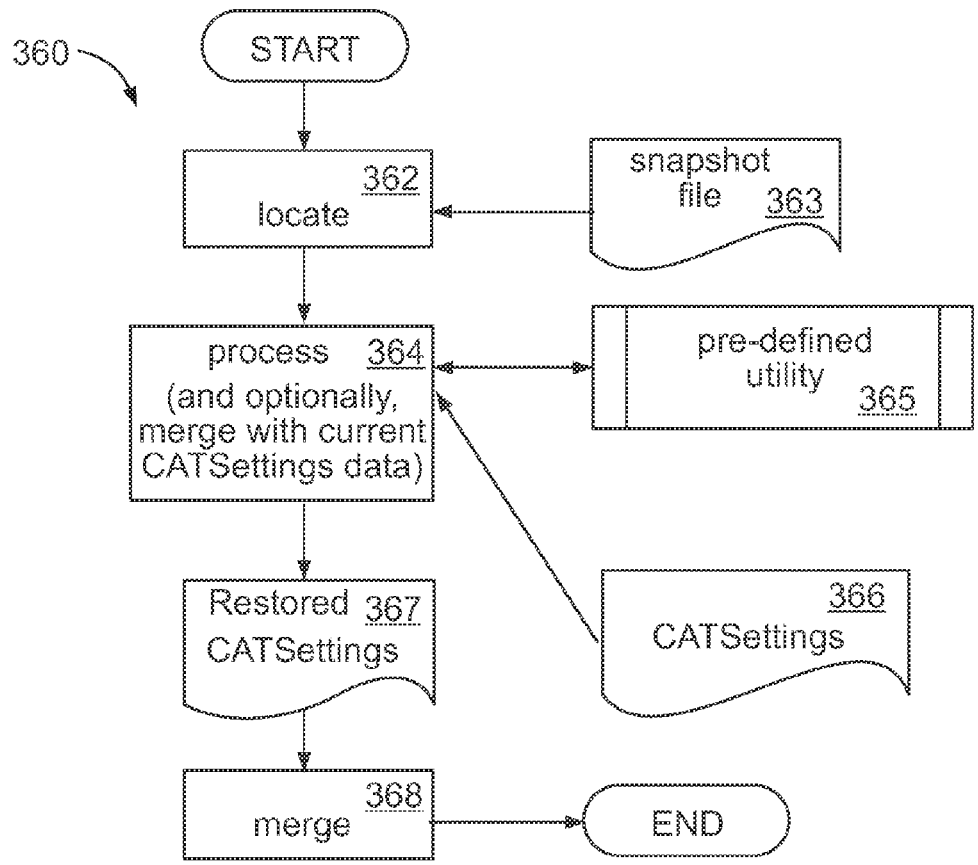
FIG. 21 is an illustration of a high level flowchart showing example operations performed by a client tool according to one or more embodiments of the present disclosure.

FIG. 21 shows an illustration of a flow diagram depicting an example restore routine 360. As shown, the restore routine 360 may first locate 362 a snapshot file 363 that will be used to restore the user's settings. In some embodiments, a user can utilize the CT user interface to navigate and select a particular snapshot file. In other embodiments, the CT 30 may scan a memory and find snapshot files on its own, or it may scan and present likely candidates to a user for selection. Next, the CT 30 may process (processing step 364) the selected snapshot file 363. The snapshot file is typically read into memory and then one or more XML files are created that represent the settings data that was stored in the snapshot file. Then, the CT 30 may utilize a pre-defined executable utility 365 (for example, CatBatImpXMLSet.exe) created by the makers of CATIA or some other third party to convert the created XML files into .CATSetting files, referred to as restored .CATSetting files 367. These current .CATSettings files may be saved in a temporary location. In some embodiments, before the restored .CATSetting files 367 are created, the processing step 364 may read in current .CATSetting files 366 and merge data within the current .CATSetting files with settings data that originated from the snapshot file 363. For example, the purpose of this merging may be to restore settings that a user intended to save while still changing certain settings in a new CATIA software release that are required to be changed. These current .CATSetting files may, for example, be settings files related to a new version of the CATIA software program that was recently installed. Next, after the restored .CATSetting files are created and stored, perhaps in a temporary location, the CT 30 may install 368 the restored .CATSetting files. For example, the current .CATSettings files 366 may be renamed with .CATSettings.OldVersion file extension, and perhaps moved to different folder (or a sub-folder), for example called "Old versions." Finally, the CT 30 may move the restored .CATSetting files to the default location where the CATIA program expect to find settings files.

In addition to the benefits of the method 100 already described in this disclosure, the following describes further benefits of one or more embodiments. It is to be understood that benefits and advantages described throughout this disclosure are not limitations or requirements, and some embodiments may omit one or more of the described benefits and/or advantages.

The SSMT 10 may reduce the chance of human error when a user or administrator alters CATSettings. Likewise, the SSMT 10 may reduce the chance of human error when a user or administrator compares and/or tests customized CATSettings. The SSMT 10 may also drastically simplify the task of comparing, testing and altering CATSettings by presenting settings from many CATSettings files (for example, more than 1,000 files) to a user or administrator via a user-friendly user interface. All CATSetting information associated with a particular installation of CATIA can then be displayed in a single location, viewable and editable with a single tool.

Existing methods of managing CATSettings are mostly or entirely manual. A typical existing solution involves opening the CATIA GUI and physically navigating to multiple screens and tabs, clicking on checkboxes and selecting radio buttons (for example a separate radio button for each CATIA setting, where the number of CATIA settings may exceed 3,000). An administrator would then apply model changes to a set of CATIA settings by, for each setting, looking at an entry in a spreadsheet, comparing the entry with a value as displayed in the CATIA GUIT, an manually changing the setting value if needed. The SSMT 10 automates many steps that were previously performed manually, drastically reducing the chance for human error. The SSMT 10 simplifies the process of checking all the settings of a new set of CATSettings, drastically cutting the time needed for managing CATSettings, sometimes cutting the time required from several days to a mere minute. Therefore, implementation of the SSMT 10 by an organization may drastically improve cost savings associated with maintaining CATSettings by reducing the management time, not to mention reducing project delays that may result from erroneous entries. In one study that analyzed data collected from several organizations, the results showed that, by using SSMT 10 instead of previous manual methods, a particular company could potentially save millions of dollars.

The SSMT 10 may also benefit a wide range of companies and entities across many different industries. Any company that has requirements regarding how CATIA software (or some other CAD or software tool) must look and operate, may benefit from the SSMT 10. The following are just a few examples, without limitation, of industries and companies that may benefit from the SSMT 10: the aerospace industry, the automotive industry, and the shipbuilding industry.

In some alternative implementations of the present disclosure, the function or functions illustrated in the blocks or symbols of a block diagram or flowchart may occur out of the order noted in the figures. For example in some cases two blocks or symbols shown in succession may be executed substantially concurrently or the blocks may sometimes be executed in the reverse order depending upon the functionality involved.

The software methods, routines and solutions of the present disclosure, including the example methods and routines illustrated in the flowcharts and block diagrams of the different depicted embodiments are typically executed by a data processing system that is programmed such that the data processing system is adapted to perform and/or execute the methods, routines and solutions described herein. Each block or symbol in a block diagram or flowchart diagram referenced herein may represent a module, segment or portion of computer usable or readable program code which comprises one or more executable instructions for implementing, by one or more data processing systems, the specified function or functions. Therefore, the different embodiments of the present disclosure can take the form of a computer program product accessible from a computer usable or computer readable medium providing program code for use by or in connection with a computer or any device or system that executes instructions.

Figure 22:
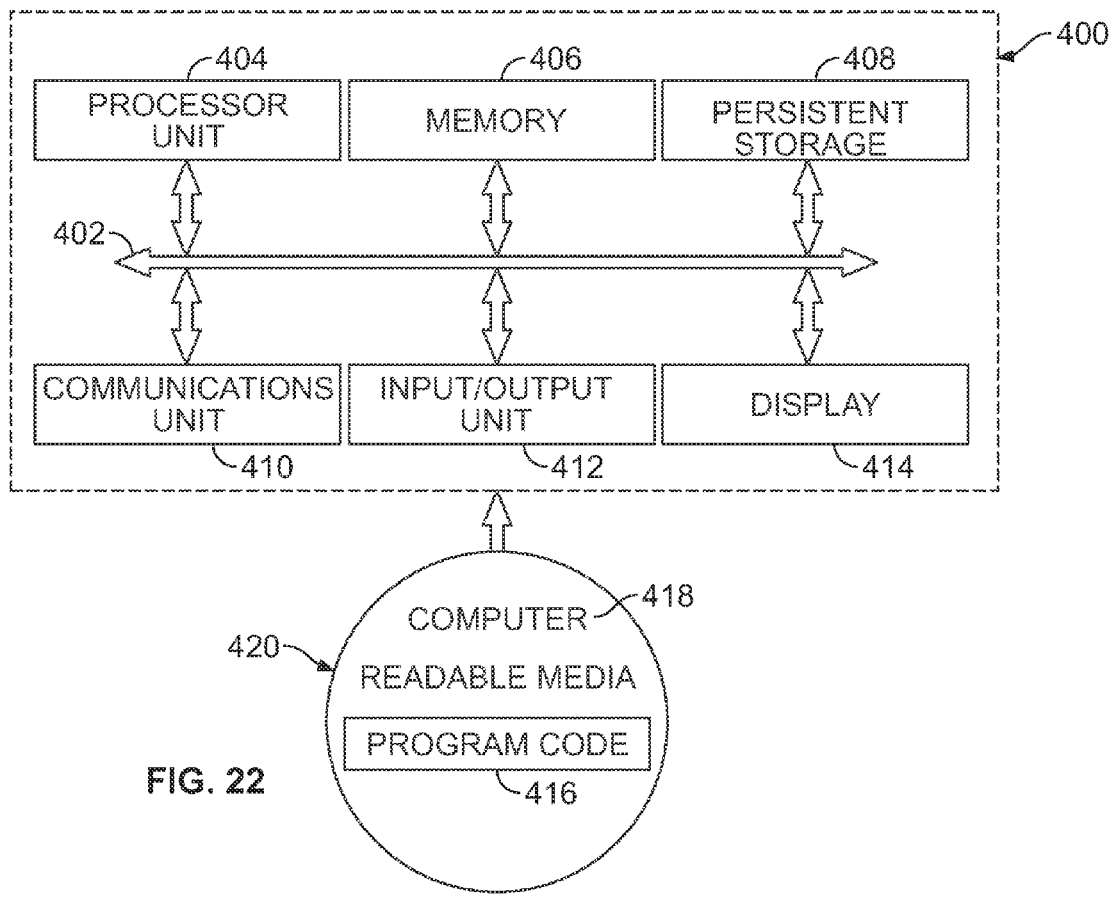
FIG. 22 is an illustration of a diagram of an example data processing system according to one or more embodiments of the present disclosure.

Turning now to FIG. 22, a diagram of an example data processing system 400 is depicted that may execute the methods, routines and solutions of the present disclosure. In this example, data processing system 400 includes a communications fabric 402 which provides communications between components such as a processor unit 404, a memory 406, a persistent storage 408, a communications unit 410, an input/output (I/O) unit 412 and a display 414. In one specific embodiment, the data processing system 400 may be a personal computer (PC) or other computer architecture in connection with a monitor, keyboard, mouse and perhaps other peripheral devices.

Processor unit 404 serves to execute instructions (for example, a software program) that may be loaded into memory 406. Processor unit 404 may be a set of one or more processors or may be a multiprocessor core depending on the particular implementation. Further, processor unit 404 may be implemented using one or more heterogeneous processor systems in which a main processor is present with secondary processors on a single chip. As another illustrative example, processor unit 404 may be a symmetric multi-processor system containing multiple processors of the same type.

Memory 406 in these examples may be, for example, a random access memory or any other suitable volatile or nonvolatile storage device. Persistent storage 408 may take various forms depending on the particular implementation. For example, persistent storage 408 may contain one or more components or devices. For example, persistent storage 408 may be a hard drive, a flash memory, a rewritable optical disk, a rewritable magnetic tape or some combination of the above. The media used by persistent storage 408 also may be removable. For example a removable hard drive may be used.

Instructions for an operating system may be located on persistent storage 408. In one specific embodiment, the operating system may be some version of a number of known operating systems. Instructions for applications and/or programs may also be located on persistent storage 408. These instructions may be loaded into memory 406 for execution by processor unit 404. For example, the processes of the different embodiments described in this disclosure may be performed by processor unit 404 using computer implemented instructions which may be loaded into a memory such as memory 406. These instructions are referred to as program code, computer usable program code or computer readable program code that may be read and executed by a processor in processor unit 204. The program code in the different embodiments may be embodied on different physical or tangible computer readable media such as memory 406 or persistent storage 408.

Instructions for applications and/or programs may also be located on a computer readable media 418 that is not permanently included in the data processing system 400. For example, program code 416 may be located in a functional form on computer readable media 418 and may be loaded into or transferred to data processing system 400 for execution by processor unit 404. Program code 416 and computer readable media 418 may form computer program product 420. In one example, computer readable media 418 may be in a tangible form such as, for example, an optical or magnetic disc that is inserted or placed into a drive or other device, for transfer onto a storage device such as a hard drive that is part of persistent storage 408. The drive or other device may be connected to and in communication with other components of the data processing system 400, for example, via the communications fabric 402. In another tangible form, computer readable media 418 may be a persistent storage such as a hard drive or a flash memory that is connected to data processing system 400.

For the purposes of this disclosure a computer usable or computer readable medium can generally be any tangible apparatus that can contain, store, communicate, propagate or transport the data (such as a software program) for use by or in connection with a system, for example one that executes instructions. The computer usable or computer readable medium can be for example without limitation an electronic magnetic optical electromagnetic infrared or semiconductor system or a propagation medium. Non-limiting examples of a computer readable medium include a semiconductor or solid state memory magnetic tape a removable computer diskette a random access memory (RAM) a read only memory (ROM) a rigid magnetic disk and an optical disk. Optical disks may include compact disk read only memory (CD ROM) compact disk read write (CD R/W) and DVD. Further, a computer usable or computer readable medium may contain or store a computer readable or usable program code such that when the computer readable or usable program code is executed on a computer the execution of this computer readable or usable program code causes the computer to execute specified routines, procedures, steps and the like. The tangible form of computer readable media is also referred to as computer recordable storage media.

Display 414 provides a mechanism to display information to a user, for example via a CRT, LCD or LED monitor, or other type of display. It should be understood, throughout this disclosure, that the term "display" may be used in a flexible manner to refer to either a physical display such as a monitor, or to the image that a user sees on the screen of a physical device. For example, the display 414 shown in FIG. 22 may contemplate a physical display (such as a monitor), and the monitor may present a display (such as an image of the Administration Tool, see FIG. 9) to a user.

Input/output (I/O) unit 412 allows for input and output of data with other devices that may be connected to data processing system 400. For example, input/output unit 412 may provide a connection for user input through a keyboard, touch screen, mouse, and/or other pointing devices. Further, input/output unit 412 may send output to a printer. Input/output devices can be coupled to the system either directly or through intervening I/O controllers. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

Program code 416 may be transferred to data processing system 400 from computer readable media 418 through a connection to input/output unit 412. The connection may be physical or wireless in the illustrative examples. The computer readable media also may take the form of non-tangible media such as communications links or wireless transmissions containing the program code.

The different components illustrated for data processing system 400 are not meant to provide architectural limitations to the manner in which different embodiments may be implemented The different illustrative embodiments may be implemented in a data processing system including components in addition to or in place of those illustrated for data processing system 400. Other components shown in FIG. 22 can be varied from the illustrative examples shown. For example, a bus system may be used to implement communications fabric 402 and may be comprised of one or more buses such as a system bus or an input/output bus. The bus system may be implemented using any suitable type of architecture that provides for a transfer of data between different components or devices attached to the bus system. Additionally a communications unit may include one or more devices used to transmit and receive data such as a modem or a network adapter. Further a memory may be, for example, memory 406 and/or a cache such as those found in an interface and memory controller hub that may be present in communications fabric 202.

Communications unit 410 may provide for communications with other data processing systems or devices. In these examples, communications unit 410 may be a network interface card. Communications unit 410 may provide communications through the use of either or both physical and wireless communications links unit allows for input and of data. Accordingly, as an alternative to a physical or wired connection, program code 416 may be transferred (or "pushed") to data processing system 400 from computer readable media 418 through a communications link to communications unit 410. The communications link may be physical or wireless in the illustrative examples. The computer readable media also may take the form of non-tangible media such as communications links or wireless transmissions containing the program code.

Figure 23:
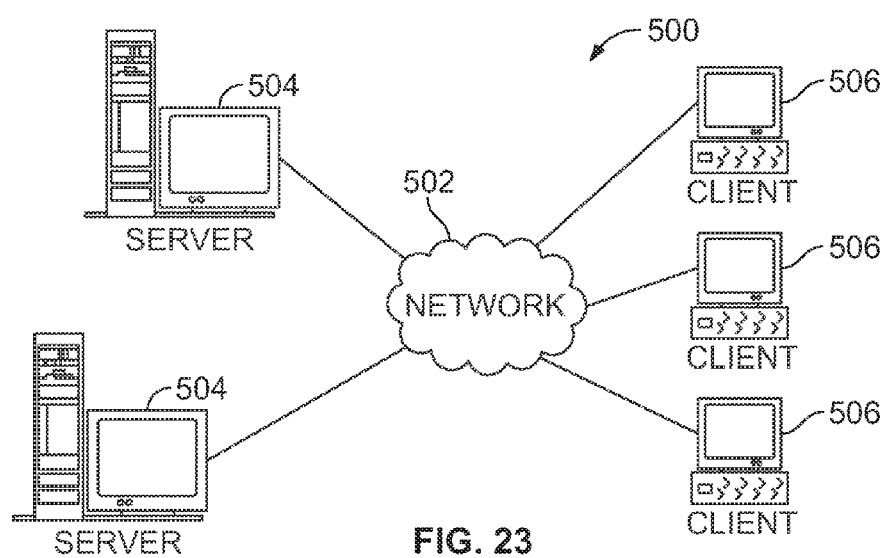
FIG. 23 is an illustration of a diagram of an example network of data processing systems according to one or more embodiments of the present disclosure.

Referring to FIG. 23, a diagram of an example network of data processing systems is depicted according to one or more embodiments of the present disclosure. Network data processing system 500 is a network of data processing systems 504, 506, whereby more specifically, a network 502 connects two or more data processing systems. Network 502 is a medium used to provide communications links between various data processing systems (and perhaps other devices), and network 502 may include connections such as wired or wireless communication links, or perhaps fiber optic cables. Typically, each data processing system would include a communications unit 410 (see FIG. 22), thereby allowing the data processing system to interact with the network 502 and other data processing systems.

In the example shown in FIG. 23, one or more servers 504 (or administrator machines) are connected to network 502. In addition, one or more clients 506 are connected to network 502. These clients 506 may be for example personal computers or end-user computers (or client machines). In the depicted example, a server 504 may provide (for example by "pushing") data such as boot files, operating system images, applications and/or software programs to clients 506. In these examples, servers 504 and clients 506 may be computers located within a single building or region, in which case the network 502 may be an internal network such as an intranet. In other examples, the servers 504 and clients 506 may be computers located in different geographic locations, in which case the network 502 may include internet connections and perhaps remote secured connections. In some examples, network 502 represents a worldwide collection of networks and gateways that use the Transmission Control Protocol Internet Protocol (TCP IP) suite of protocols to communicate with one another. Network data processing system 500 also may be implemented as a number of similar or different types of networks such as, for example an intranet, a local area network (LAN) or a wide area network (WAN). FIG. 23 is intended as an example and not as an architectural limitation for different embodiments. It should be understood that network data processing system 500 may include additional (or fewer) servers 504, clients 506 and perhaps other devices not shown.

The description of the different advantageous embodiments has been presented for purposes of illustration and description and is not intended to be exhaustive or limited to the embodiments in the form disclosed. Many modifications and variations will be apparent to those of ordinary skill in the art. Further different advantageous embodiments may provide different advantages as compared to other advantageous embodiments. The embodiment or embodiments selected are chosen and described in order to best explain the principles of the embodiments the practical application and to enable others of ordinary skill in the art to understand the disclosure for various embodiments with various modifications as are suited to the particular use contemplated.

The invention claimed is:

1. A computer implemented method for managing software settings, the method comprising:
    executing, on a computer, a pre-defined utility to convert one or more files of a proprietary format into one or more markup language files, wherein each file of a proprietary format includes data representing one or more software settings that control how a software program looks or functions or both, and wherein each markup language file includes data representing one or more abstracted settings that correlate to one or more software settings contained in one or more of the files of a proprietary format;

executing, on the computer, a routine that combines the data from the one or more markup language files with data from a template file to create a single combination of data, wherein the template file includes data representing one or more abstracted settings, and wherein the template file includes, for at least one abstracted setting, path data that indicates a feature or setting that controls a graphical user interface related to the software program;

executing, on the computer, a routine that exports a portion of the data within the single combination of data to create one or more new markup language files;

executing, on the computer, a pre-defined utility to convert the one or more new markup language files to one or more new files of a proprietary format;

executing, on the computer, a routine that backs up one or more current files of a proprietary format;

executing, on the computer, a routine that installs the one or more new files of a proprietary format by moving or copying the new files of a proprietary format to a memory location where an installation of the software program locates software settings files by default, wherein the memory location where the installation of the software program locates software settings files by default is located on a separate computer that is connected to a network, whereby the new files of a proprietary format are pushed to the separate computer via the network; and displaying, via a user interface that communicates with a display coupled to the computer, the single combination of data to a user, the user interface comprising an editable interface that presents both the data of the one or more markup files and the data of the template file, wherein the data of the one or more markup files and the data of the template file are modifiable in response to user input.

2. The computer implemented method of claim 1 further comprising:
executing, on the computer, a routine that selects the template file from a group of one or more template files, wherein each of the template files within the group contains data that represents settings related to a particular use.

3. The computer implemented method of claim 1 further comprising:
executing, on the computer, a routine that determines whether the user is authorized to initiate execution of one or more routines.

4. The computer implemented method of claim 1 wherein the routine that combines the data from the one or more markup language files with the data from a template file to create a single combination of data further includes the step of converting the data from the one or more markup language files to graphical user interface objects that control in part how the display operates.

5. The computer implemented method of claim 1 wherein the displaying step displays the single combination of data to the user as one or more visual grids,
wherein each visual grid includes one or more fields, wherein each field displays information related to a portion of the data included in the single combination of data.

6. The computer implemented method of claim 5 wherein the user interface and the display are adapted to allow the user to interact with the single combination of data to initiate a routine that adds data to the single combination of data and displays the added data as one or more additional fields.

7. The computer implemented method of claim 5 wherein the user interface and the display are adapted to allow the user to interact with data within the single combination of data that represents correlation information between one or more abstracted settings and one or more software settings contained in one or more files of a proprietary format.

8. The computer implemented method of claim 5 wherein the user interface and the display are adapted to allow the user to interact with the single combination of data to initiate a routine that searches one or more fields.

9. The computer implemented method of claim 5 further comprising:
executing, on the computer, a routine that modifies a portion of the data within the single combination of data, wherein the modified data relates to information displayed in one or more fields.

10. The computer implemented method of claim 9 wherein the user interface and the display are adapted to allow the user to interact with the single combination of data to initiate a routine that displays an edit window.

11. The computer implemented method of claim 9 wherein the user interface and the display are adapted to allow the user to interact with the single combination of data to initiate a routine that:
allows the user to add data to the single combination of data,
displays an updated representation of the single combination of data that includes one or more additional fields.

12. The computer implemented method of claim 9 wherein the user interface and the display are adapted to allow the user to interact with the single combination of data to initiate a routine that copies data associated with a first visual grid to associate the copied data with a second visual grid.

13. The computer implemented method of claim 5 wherein the user interface and the display are adapted to allow the user to interact with the single combination of data to initiate a routine that displays or highlights changes that have been made to the single combination of data.

14. The computer implemented method of claim 5 further comprising:
executing, on the computer, a routine that exports a portion of the data within the single combination of data to create one or more new template files.

15. A data processing system comprising:
a bus;
a storage device or memory device connected to the bus, wherein the storage device or memory device includes computer usable program code;
a display connected to the bus; and
a processor unit connected to the bus, wherein the processor unit executes the computer usable program code to:
execute a pre-defined utility to convert one or more files of a proprietary format into one or more markup language files,
wherein each file of a proprietary format includes data representing one or more software settings that control the way a software program looks or functions or both, and wherein each markup language file includes data representing one or more abstracted settings that correlate to one or more software settings contained in one or more of the files of a proprietary format;
execute a routine that combines the data from the one or more markup language files with data from a template file to create a single combination of data,
    wherein the template file includes data representing one or more abstracted settings, and
    wherein the template file includes, for at least one abstracted setting, path data that indicates a feature or setting that controls a graphical user interface related to the software program;
execute a routine that exports a portion of the data within the single combination of data to create one or more new markup language files;
execute a pre-defined utility to convert the one or more new markup language files to one or more new files of a proprietary format;
execute a routine that backs up one or more current files of a proprietary format;
execute a routine that installs the one or more new files of a proprietary format by moving or copying the new files of a proprietary format to a memory location where an installation of the software program locates software settings files by default;
    wherein the memory location where the installation of the software program locates software settings files by default is located on a separate computer that is connected to a network, whereby the new files of a proprietary format are pushed to the separate computer via the network; and
display, via a user interface that communicates with the display, the single combination of data to a user, the user interface comprising an editable interface that presents both the data of the one or more markup files and the data of the template file, wherein the data of the one or more markup files and the data of the template file are modifiable in response to user input.

16. The data processing system of claim 15 wherein execution of the computer usable program code that displays the single combination of data causes the display to visualize the single combination of data as one or more visual grids,
    wherein each visual grid includes one or more fields, wherein each field displays information related to a portion of the data included in the single combination of data.

17. A computer implemented method for managing software settings, the method comprising:
displaying, via a display coupled to a computer, a user interface that allows a user to select a first one or more files of a proprietary format,
    wherein each of the first one or more files of a proprietary format includes data representing one or more software settings that control the way a software program looks or functions or both, the data of the one or more software settings being determined based on a current state of a software program associated with the one or more software settings, the data of the one or more software settings being defined by the user;
executing, on the computer, a pre-defined utility to convert the first one or more files of a proprietary format into one or more markup language files,
    wherein each markup language file includes data representing one or more abstracted settings that correlate to one or more software settings contained in the one or more of the files of a proprietary format;
executing, on the computer, a routine that combines the data from the one or more markup language files to create a single combination of data;
executing, on the computer, a routine that exports a portion of the data within the single combination of data to create one or more new markup language files;
executing, on the computer, a pre-defined utility to convert the one or more new markup language files to one or more new files of a proprietary format;
executing, on the computer, a routine that backs up one or more current files of a proprietary format;
executing, on the computer, a routine that installs the one or more new files of a proprietary format by moving mat to a memory location where an installation of the software program locates software settings files by default;
    wherein the memory location where the installation of the software program locates software settings files by default is located on a separate computer that is connected to a network, whereby the new files of a proprietary format are pushed to the separate computer via the network;
executing, on the computer, a routine that saves the single combination of data to a snapshot file that is stored on a memory device;
displaying, via a display coupled to the computer, a user interface that allows a user to select the snapshot file; and
executing, on the computer, a pre-defined utility to convert data from the snapshot file into a second one or more files of a proprietary format, the second one or more files of a proprietary format being used to restore the one or more user-defined settings.

* * * * *